(12) United States Patent
Wane et al.

(10) Patent No.: US 12,273,472 B2
(45) Date of Patent: Apr. 8, 2025

(54) SYSTEMS AND METHODS FOR ASYMMETRIC AUTHENTICATION IN DECENTRALIZED MOBILE NETWORKS

(71) Applicant: Bloxtel Inc., San Francisco, CA (US)

(72) Inventors: Ismaila Wane, San Francisco, CA (US); Karsten Ohme, Dresden (DE)

(73) Assignee: Bloxtel, Inc., San Francisco, CA (US)

( * ) Notice: Subject to any disclaimer, the term of this patent is extended or adjusted under 35 U.S.C. 154(b) by 0 days.

(21) Appl. No.: 18/170,039

(22) Filed: Feb. 16, 2023

(65) Prior Publication Data

US 2023/0396455 A1  Dec. 7, 2023

Related U.S. Application Data

(60) Provisional application No. 63/431,180, filed on Dec. 8, 2022, provisional application No. 63/402,949, filed on Sep. 1, 2022, provisional application No. 63/348,497, filed on Jun. 3, 2022.

(51) Int. Cl.
| | | |
|---|---|---|
| *H04L 9/00* | (2022.01) | |
| *H04W 8/04* | (2009.01) | |
| *H04W 12/71* | (2021.01) | |

(52) U.S. Cl.
CPC ............... *H04L 9/50* (2022.05); *H04W 8/04* (2013.01); *H04W 12/71* (2021.01)

(58) Field of Classification Search
CPC ............ H04L 9/50; H04W 8/04; H04W 12/71
See application file for complete search history.

(56) References Cited

U.S. PATENT DOCUMENTS

| | | | |
|---|---|---|---|
| 9,722,790 B2 | 8/2017 | Ebrahimi | |
| 11,323,324 B2 | 5/2022 | Dasgupta et al. | |
| 11,405,387 B1* | 8/2022 | Griffin | ........... H04L 9/0866 |
| 2004/0001091 A1* | 1/2004 | Kressin | ............ H04N 7/147 |
| | | | 715/753 |
| 2009/0034521 A1* | 2/2009 | Kato | ............. G06F 21/34 |
| | | | 370/389 |
| 2012/0260023 A1* | 10/2012 | Nagai | ........... G06F 12/1408 |
| | | | 711/E12.008 |

(Continued)

FOREIGN PATENT DOCUMENTS

| | | |
|---|---|---|
| CN | 111385750 A | 7/2020 |
| EP | 3579494 A1 | 12/2019 |
| EP | 3836525 A1 | 6/2021 |

OTHER PUBLICATIONS

Lei et al., "Blockchain Based Spectrum Sharing over 6G Hybrid Cloud," 2021, https://ieeexplore.ieee.org/document/9498978 (6 pages).

(Continued)

*Primary Examiner* — Taghi T Arani
*Assistant Examiner* — Blake I Narramore
(74) *Attorney, Agent, or Firm* — K&L Gates LLP

(57) ABSTRACT

An apparatus includes a processing device, communications hardware configured to enable wireless communication by the apparatus, and a universal integrated circuit card (UICC). The UICC stores a decentralized electronic subscriber identity module (dSIM) that hosts a decentralized access application that is configured to exchange information with a decentralized mobile network core utilizing the communications hardware to perform an asymmetric authentication session.

23 Claims, 30 Drawing Sheets

(56) References Cited

U.S. PATENT DOCUMENTS

| | | | |
|---|---|---|---|
| 2016/0019536 A1* | 1/2016 | Ortiz | G06Q 20/36 |
| | | | 705/67 |
| 2018/0048738 A1 | 2/2018 | Hinds | |
| 2019/0053051 A1* | 2/2019 | Yu | H04L 61/00 |
| 2019/0098016 A1* | 3/2019 | Jeon | H04L 63/0823 |
| 2019/0174314 A1* | 6/2019 | Joseph | H04W 12/06 |
| 2020/0052905 A1* | 2/2020 | Mathias | H04L 9/3265 |
| 2020/0314648 A1* | 10/2020 | Cao | H04L 9/0637 |
| 2021/0118085 A1* | 4/2021 | Bushnell | H04L 9/50 |
| 2021/0150626 A1* | 5/2021 | Robotham | G06Q 50/28 |
| 2021/0176802 A1* | 6/2021 | Sirotkin | H04W 36/0033 |
| 2021/0400474 A1* | 12/2021 | Stauffer | H04L 9/0825 |
| 2022/0021728 A1* | 1/2022 | Kelly | H04L 67/06 |
| 2022/0123944 A1* | 4/2022 | Wang | G06F 21/30 |
| 2022/0132310 A1* | 4/2022 | Tsuoka | H04L 9/32 |
| 2022/0166638 A1* | 5/2022 | Razi | H04L 9/3278 |
| 2022/0321475 A1* | 10/2022 | Thiebaut | H04L 47/11 |
| 2022/0385670 A1* | 12/2022 | Lim | H04L 63/105 |
| 2022/0414698 A1* | 12/2022 | Doumar | G06F 16/9554 |
| 2023/0121852 A1* | 4/2023 | Yan | H04L 9/3268 |
| | | | 713/153 |
| 2023/0124519 A1* | 4/2023 | Singh | H04W 8/20 |
| | | | 455/12.1 |
| 2023/0139656 A1* | 5/2023 | Bishnoi | G06F 11/3457 |
| | | | 703/22 |

OTHER PUBLICATIONS

Singh, Nicole, "What is the 5G Access and Mobility management Function (AMF)?" Jan. 5, 2023; (2 pages); https://www.metaswitch.com/knowledge-center/reference/what-is-the-5g-access-and-mobility-management-function-amf.

Singh, Vipin et al., "Blockchain in Telecom: Which companies are leading the research?" Blockchain in Telecom Solutions; (internet pages printed Feb. 17, 2023); (14 pages) https://www.greyb.com/companies-researching-blockchain-telecom-solutions/.

Palmer, Daniel, "Verizon Just Won a Patent to Create Virtual SIMs on a Blockchain," CoinDesk; Sep. 20, 2019; (5 pages) https://www.coindesk.com/markets/2019/09/20/verizon-just-won-a-patent-to-create-virtual-sims-on-a-blockchain/.

* cited by examiner

SYSTEMS AND METHODS FOR ASYMMETRIC AUTHENTICATION IN DECENTRALIZED MOBILE NETWORKS

CROSS-REFERENCE TO RELATED APPLICATIONS

This application claims the benefit of: U.S. Provisional Patent Application No. 63/431,180, filed, Dec. 8, 2022, and titled "SYSTEMS AND METHODS FOR ASYMMETRIC AUTHENTICATION IN DECENTRALIZED MOBILE NETWORKS"; U.S. Provisional Patent Application No. 63/348,497, filed, Jun. 3, 2022, and titled "SYSTEMS AND METHODS FOR AN INTELLIGENT MULTI-CHAIN OFFLOADING CELLULAR PLATFORM"; and U.S. Provisional Patent Application No. 63/402,949, filed Sep. 1, 2022, and titled "SYSTEMS AND METHODS FOR A DECENTRALIZED ELECTRONIC SUBSCRIBER IDENTITY MODULE". The entire contents of all of the above applications are incorporated herein by reference.

TECHNOLOGICAL FIELD

Embodiments of the present disclosure relate generally to telecommunication systems, and more particularly, but not by way of limitation, to mechanisms enabling asymmetric authentication of decentralized, blockchain-based mobile networks with user equipment containing an enhanced electronic subscriber identity module (eSIM) referred to as decentralized electronic subscriber identity module (dSIM).

BACKGROUND

The use of wireless communication networks to facilitate communications between various devices, such a mobile user equipment (UE), has become increasingly prevalent. When the UE accesses the wireless communication network, a mutual authentication process between the network and the UE is performed to verify that the UE has the appropriate permissions to access the wireless communication network. Through the mutual authentication process, a Mobile Network Operator (MNO) may identify the UE and determine whether the UE is allowed to access the wireless communication network managed by the MNO.

5G and older mobile communication standards (e.g., 4G/LTE) utilize a symmetric authentication scheme between a Subscriber Identity Module (SIM) application inside a tamper-resistant Universal Integrated Circuit Chip (UICC) inside the UE, and the mobile core network. Each UICC inside the UE, such as a phone, a tablet or an IoT device, may authenticate against the mobile network core of the home network operator by default. Complex roaming agreements and technical setups between different MNOs may be used to allow UICCs to connect to visited third-party networks for offloading purposes. With the advent of decentralized private mobile networks, it is envisioned that the global telecommunications industry could potentially experience a significant shift from about a thousand of mobile operators to millions of mobile operators, possibly before 2030 when 6G mobile communication technology are projected to be deployed. In that scenario, offloading is not just about international roaming (e.g., a subscriber visiting another country and connecting via the local operator), it will also include domestic roaming (e.g., a subscriber's device such as a smartphone or a drone moving around a city or a neighborhood and connecting seamlessly via multiple networks to the mobile Internet).

BRIEF SUMMARY

As described above, the number of mobile operators in the telecommunications industry is predicted to greatly expand in the future. As understood by the inventors, moving from several hundred public mobile networks to potentially millions of private networks is not scalable from an interoperability standpoint using existing systems and methods. Centralized symmetric authentication to a single network core compounded with roaming agreements with various quality-of-Service (QoS) requirements may rapidly reach its practical limits even with available network slicing mechanisms. Asymmetric authentication scales better in a world of tens of billions of cellular devices and millions of decentralized mobile networks. In some embodiments of the present disclosure asymmetric authentication may be integrated with blockchain technology for existing mobile communication protocols, 6G mobile communication protocols, and beyond.

Asymmetric authentication may be a more secure encryption protocol than symmetric authentication. With asymmetric authentication, a public key represents a privacy-preserving subscriber's digital identity token that can be shared with the outside world to encrypt messages while a private key is securely stored and maintained inside a tamper-resistant container (e.g., UICC/embedded UICC/integrated UICC) by the subscriber to decrypt messages. Since subscribers may not reveal or share their private keys, the possibility of a malicious entity discovering a subscriber's private key during transmission is essentially eliminated.

An architecture of some newer mobile network cores may focus on lowering network latency by performing authentication at the edge, and may utilize some type of orchestration servers. The orchestration servers may push symmetric keys (Kis) to all nodes (i.e., access gateways) of the mobile network that are caching the Kis. In a decentralized mobile network system whereby independent nodes are incentivized to host network equipment locally, this caching mechanism may represent a potential security risk. Using asymmetric authentication reduces and/or eliminates such vulnerabilities as nodes do not have access to the private keys of the subscribers, but only public keys. Ultra-low latency may be achieved by utilizing authentication performed at the edge with orchestration servers communicating network attachment session information across nodes of multiple decentralized mobile networks to provide seamless roaming. Energy-efficiency may be achieved by implementing an architecture that reduces and/or minimizes impact on power consumption by both the UE and mobile network's equipment. International and domestic roaming (hereafter referred to as just offloading) may be further simplified as public keys are exchanged with business rules based on commercial agreements (e.g., using blockchain-based smart contracts).

According to some embodiments of the present disclosure, a decentralized authentication approach may utilize asymmetric authentication via an extensible authentication protocol (EAP)-dAKA (decentralized authentication and key agreement) mechanism (or similar) using a mutual authentication method with asymmetric keys including a key agreement to address existing challenges and enable an interoperable ecosystem architecture. The SIM profile in the UICC (or eUICC or iUICC) in the context of the decentralized mobile network is hereafter referred to as a decentralized (physical, electronic, or integrated) SIM (or dSIM) consisting of at least a modified network access application (NAA) referred hereafter to as dAA. Embodiments of the present disclosure may establish backward compatibility with existing 5G and 4G/LTE systems as well as utilize a purpose-built blockchain-telecom distributed ledger managing the lifecycle of dSIMs linked to semi-fungible and non-fungible cryptographic tokens.

In one example embodiment, an apparatus is provided. The apparatus includes a processing device, communications hardware configured to enable wireless communication by the apparatus, and a universal integrated circuit card (UICC). The UICC stores a decentralized electronic subscriber identity module (dSIM) that hosts a decentralized access application that is configured to exchange, utilizing the processing device, information with a decentralized mobile network core utilizing the communications hardware to perform an asymmetric authentication session.

In an example, the processing device is configured to: retrieve the decentralized access application from a blockchain ledger as a semi-fungible token; and install and activate the decentralized access application, thereby converting the decentralized access application to a non-fungible token on the blockchain ledger. In some embodiments, the activation of the decentralized access application results in a creation of a public-private keypair, and a public key of the public-private keypair is stored on the blockchain ledger. In some embodiments, the public key of the public-private keypair is configured to be retrieved by the decentralized mobile network core from the blockchain ledger for identification, authentication, and/or handover purposes.

In an example, the decentralized mobile network core comprises a modified Unified Data Management (UDM) for 5G or a modified Home Subscriber Server (HSS) for 4G/LTE.

In an example, to perform an asymmetric authentication session, the processing device is configured to tunnel data related to the asymmetric authentication session using at least one of an authentication token or a random value. In some embodiments, to tunnel the data related to the asymmetric authentication session using the at least one of the authentication token or the random value, the processing device is configured to wrap the data into multiple packets having a same size as the at least one of the authentication token or the random value. In some embodiments, the processing device is configured to tunnel the data related to the asymmetric authentication session responsive to detecting a flag having a defined value as part of an authentication request. In some embodiments, the flag is the authentication token and the defined value is all zeros.

In another example embodiment, a computer-implemented method is provided. The method includes storing a decentralized access application on a universal integrated circuit card of a user equipment, activating the decentralized access application to generate a public-private keypair, and utilizing the public-private keypair to perform an asymmetric authentication operation with a decentralized mobile network core.

In an example, the method further includes accessing, from a blockchain ledger, a semi-fungible token, wherein the semi-fungible token comprises the decentralized access application. In some embodiments, activating the decentralized access application to generate a public-private keypair converts the semi-fungible token into a non-fungible token on the blockchain ledger. In some embodiments, a public key of the public-private keypair is stored on the blockchain ledger. In some embodiments, the public key of the public-private keypair is configured to be retrieved by the decentralized mobile network core from the blockchain ledger for identification, authentication, and/or handover purposes.

In an example, storing the decentralized access application on the universal integrated circuit card of the user equipment comprises storing the decentralized access application a component of a decentralized electronic subscriber identity module of a removable, integrated, or virtual circuit chip.

In an example, the decentralized mobile network core comprises a modified Unified Data Management (UDM) for 5G or a modified Home Subscriber Server (HSS) for 4G/LTE.

In an example, utilizing the public-private keypair to perform the asymmetric authentication operation with the decentralized mobile network core comprises tunneling data related to the asymmetric authentication operation using at least one of an authentication token or a random value. In some embodiments, tunneling the data related to the asymmetric authentication operation using the at least one of the authentication token or the random value comprises wrapping the data into multiple packets having a same size as the at least one of the authentication token or the random value. In some embodiments, tunneling the data related to the asymmetric authentication operation is performed responsive to detecting a flag having a defined value as part of an authentication request. In some embodiments, the flag is the authentication token and the defined value is all zeros.

In another example embodiment, an apparatus is provided. The apparatus includes communications hardware configured to exchange data with devices in a decentralized mobile network, a memory, and a processing device, operatively coupled to the memory. The processing device is configured to obtain, via the communications hardware, a registration request from a user equipment (UE), decrypt a portion of the registration request using asymmetric decryption to obtain a public key of the UE, validate the UE for the decentralized mobile network based on the public key of the UE, and, responsive to validating the UE for the decentralized mobile network, transmit a signature of the apparatus to the UE.

In an example, the apparatus further includes a blockchain interface, and, to validate the UE for the decentralized mobile network based on the public key of the UE, the processing device is configured to access a blockchain ledger to obtain a certificate based on the public key of the UE and validate the certificate.

In an example, the registration request from the UE comprises a random number, and the processing device is further configured to generate the signature of the apparatus based on the random number of the registration request.

In an example, the processing device is further configured to: obtain, via the communications hardware, a personalization request from the UE, wherein the personalization request comprises a public key of a personalization server; validate the personalization server based on the public key of the personalization server to obtain an internet protocol (IP) address of the personalization server; and transmit the IP address of the personalization server to the UE. In some embodiments, the apparatus further includes a blockchain interface, and, to validate the personalization server based on the public key of the personalization server, the processing device is configured to access a blockchain ledger to obtain the IP address of the personalization server based on the public key of the personalization server.

In an example, the processing device is further configured to obtain, via the communications hardware, an authorization request from the UE and, responsive to receiving the authorization request, tunnel data related to an asymmetric authentication operation using at least one of an authentication token or a random value. In some embodiments, to tunnel the data related to the asymmetric authentication operation using the at least one of the authentication token or the random value, the processing device is configured to wrap the data into multiple packets having a same size as the at least one of the authentication token or the random value. In some embodiments, the processing device is further configured to transmit a flag having a defined value as part of a challenge request to the UE to indicate compatibility with the asymmetric authentication operation. In some embodiments, the flag is the authentication token and the defined value is all zeros.

In another example embodiment, an apparatus is provided. The apparatus includes a processing device, communications hardware configured to enable wireless communication by the apparatus, and a universal integrated circuit card (UICC) storing a decentralized access application (dAA). The dAA is configured to: transmit, utilizing the communications hardware, a personalization initialization request to a decentralized mobile network core, the personalization initialization request comprising a public key of a personalization server; and responsive to the personalization initialization request, receiving an internet protocol (IP) address of the personalization server.

In an example, the dAA is further configured to transmit, utilizing the communication hardware, a personalization request to the personalization server utilizing the IP address of the personalization server, the personalization request comprising a personalization token. In some embodiments, the personalization token is present on the UICC prior to the transmission of the personalization initialization request. In some embodiments, the dAA is further configured to generate a public-private keypair. In some embodiments, the personalization request comprises the public key of the public-private keypair. In some embodiments, responsive to the personalization request, the public key of the public-private keypair is published to a blockchain ledger.

In an example, responsive to the personalization initialization request, a connectivity of the dAA is restricted to the IP address of the personalization server.

In another example embodiment, an authentication system is provided. The authentication system includes a blockchain ledger configured to store a semi-fungible token. The semi-fungible token comprises a decentralized access application configured to be installed on a universal integrated circuit card (UICC) of a user equipment (UE) and to be activated after installation in the UE.

In an example, the semi-fungible token is configured to be converted to a non-fungible token after installation on the UE.

In an example, the decentralized access application is a component of a decentralized electronic subscriber identity module stored in a removable, integrated, or virtual circuit chip.

In an example, the activation of the decentralized access application results in a creation of a public-private keypair, and a public key of the public-private keypair is stored on the blockchain ledger. In some embodiments, the public key of the public-private keypair is configured to be retrieved by a decentralized mobile network core from the blockchain ledger for identification, authentication, and/or handover purposes.

In an example, the blockchain ledger is a distributed blockchain ledger, and the distributed blockchain ledger is managed by a group of randomly selected validators from a pool of authorized validators. In some embodiments, the distributed blockchain ledger utilizes a hybrid proof of work and stake mechanism to establish a consensus between the group of randomly selected validators to create new blocks of data for the distributed blockchain ledger. In some embodiments, network participants involved in the distributed blockchain ledger are rewarded according to a schedule of rewards based on a stable token pegged to a fiat currency for their respectively performed work related to a lifecycle of digital electronic subscriber identity modules.

In an example, the decentralized access application is configured to exchange information with a decentralized mobile network core to perform an asymmetric authentication session. In some embodiments, the decentralized mobile network core comprises a modified Unified Data Management (UDM) for 5G or a modified Home Subscriber Server (HSS) for 4G/LTE.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1A:
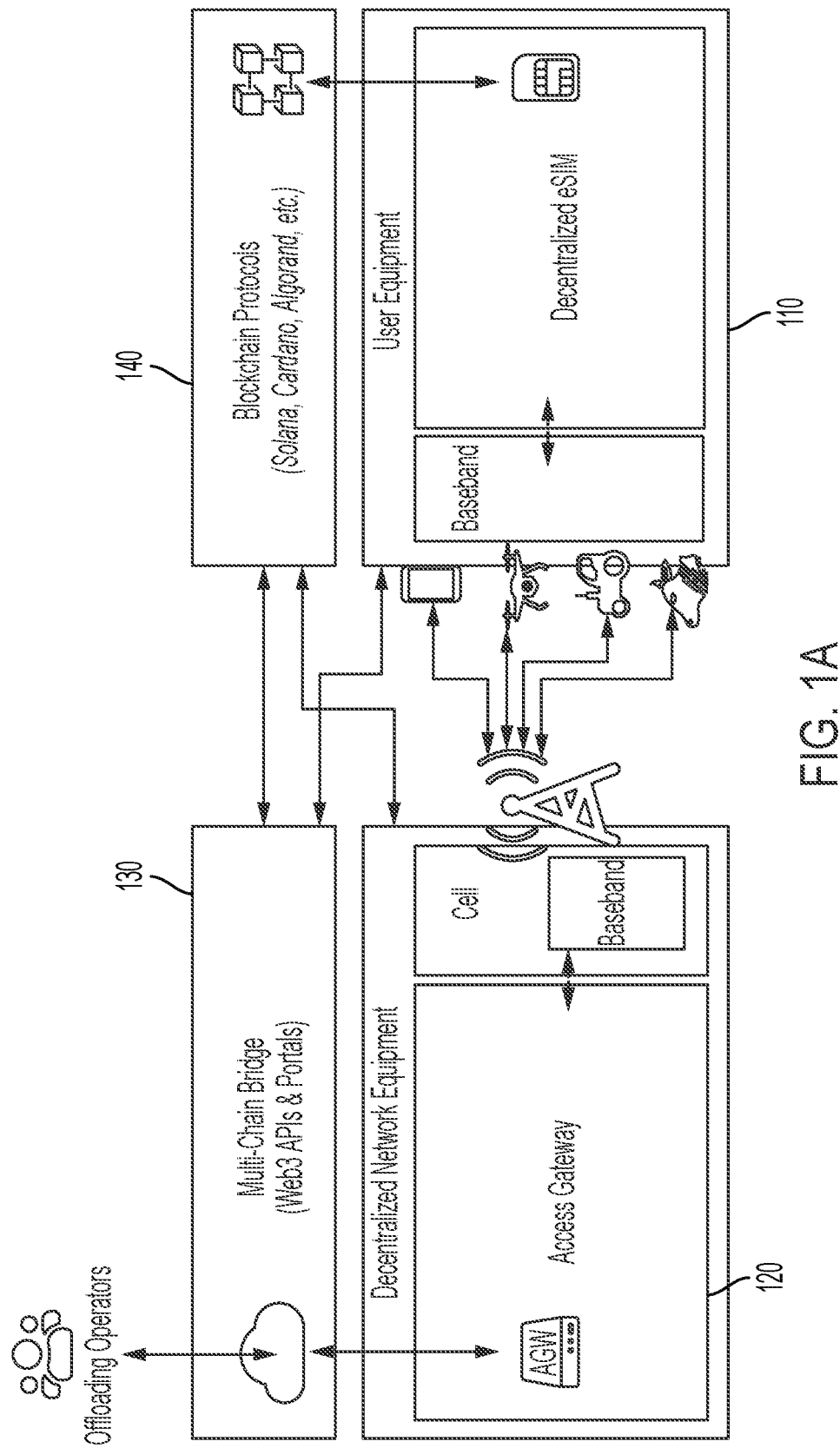
FIG. 1A illustrates a high-level architecture of a decentralized mobile network that may be used in example embodiments described herein.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "decentralized electronic subscriber identity module" and/or "dSIM" refers to one or more applications utilized by a UE for verifying coverage and/or quality of service within a network, as well as seamlessly authenticating with a plurality of public and private networks.

The term "decentralized mobile network" and/or "decentralized mobile network core" refers to one or more software applications installed in a network equipment (e.g., an access gateway) for the purpose of allowing UEs to access the network.

The term "decentralized access application" and/or "dAA" refers to an application residing inside a dSIM and allowing access to a decentralized network using asymmetric authentication.

The term "decentralized Unified Data Management" and/or "dUDM" refers to one more software applications installed in the network equipment of the decentralized mobile network.

High-Level Implementation

Embodiments of the present disclosure include systems and methods for implementing asymmetric authentication in decentralized mobile networks. In an embodiment, a decentralized (network) access application (i.e., dAA) may be installed and activated inside a decentralized electronic subscriber identity module (i.e., dSIM) and may be personalized to create a public-private keypair. The public key may be stored on a specialized blockchain-telecom ledger while the private key remains inside the UE. The dSIM may also be linked to a cryptographic token on the ledger starting as a semi-fungible token (SFT) when first published and later becoming a non-fungible token (NFT) after installation and activation. Upon a network attachment, the dAA inside the NFT dSIM exchanges information with a decentralized mobile network core (e.g., modified Unified Data Management (UDM) for 5G or modified Home Subscriber Server (HSS) for 4G/LTE) to perform an asymmetric authentication session or hand over an existing session without any interruption. A mobile network operator is interchangeably referred to as MNO or Operator throughout this disclosure.

Figure 1B:
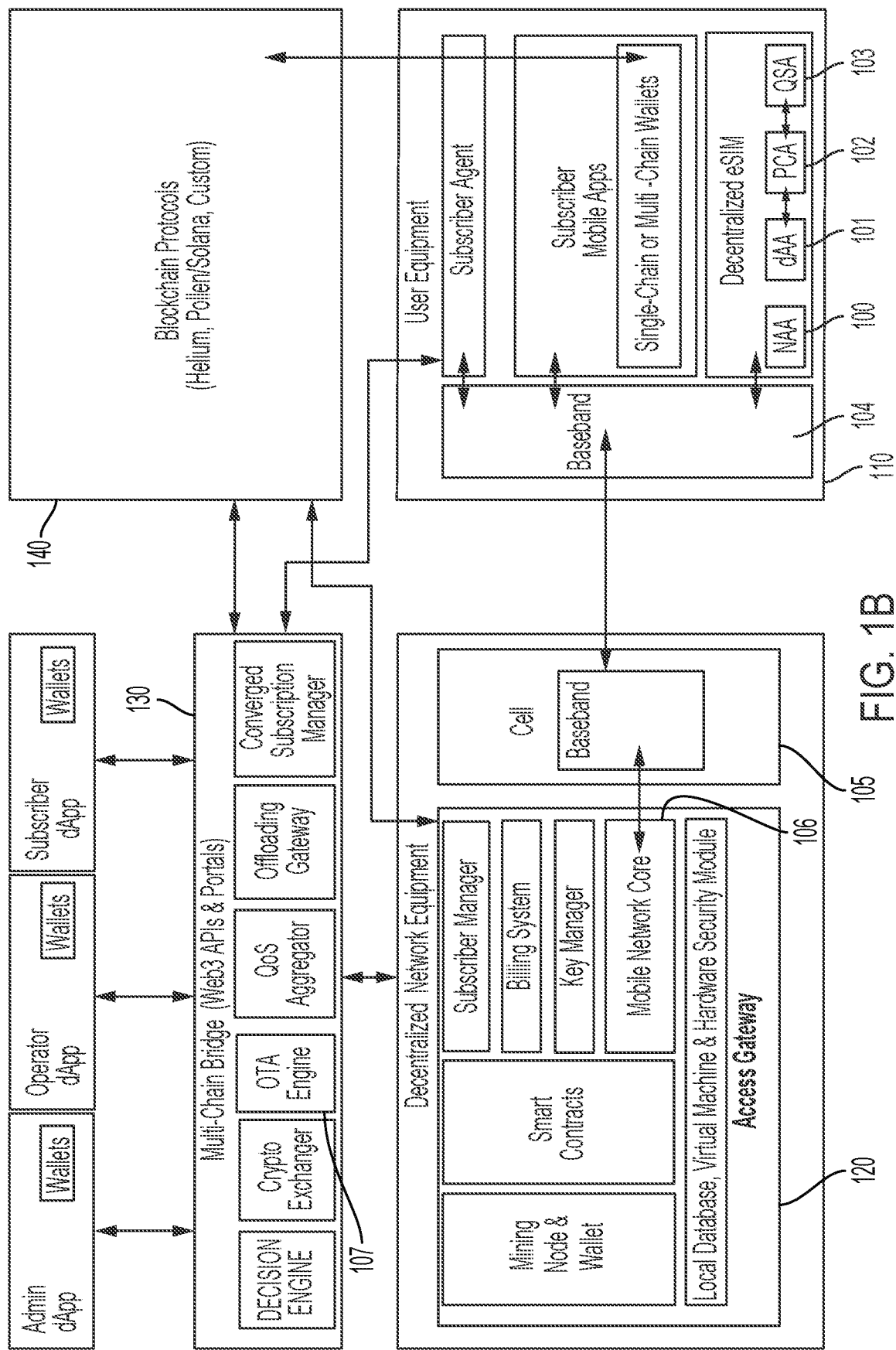
FIG. 1B illustrates components of the decentralized mobile network, as well as of an example dSIM that may be used in example embodiments described herein.

The high-level architecture of a decentralized mobile network as well as its components are illustrated in FIG. 1A and FIG. 1B. For example, FIG. 1A illustrates a high-level architecture of a decentralized mobile network that may be used in example embodiments described herein, and FIG. 1B illustrates components of the decentralized mobile network, as well as of an example dSIM that may be used in example embodiments described herein. As shown in FIGS. 1A and 1B, a high-level illustration of an example implementation includes at least three components that enable a mobile network operator to utilize decentralized cellular networks to interact with a user equipment 110: a multi-chain bridge 130, an access gateway 120, a set of blockchain protocols 140 automating the interaction among the various components within the system.

The multi-chain bridge 130 (which may be referred to as an oracle) facilitates communication by the various MNOs with various nodes in the decentralized mobile network in a transparent fashion. The multi-chain bridge 130 may provide offloading services that provide network integration, as well as billing) integration with multiple blockchain systems. In addition, the multi-chain bridge 130 provides attestation services to verify integrity of the decentralized mobile network via proofs of coverage and quality, as will be discussed in greater detail below.

To enable interaction with a decentralized mobile network, the user equipment 110 may have additional software applications installed thereon. As shown in FIG. 1B, rather than simply utilize a SIM card or eSIM, the user equipment 110 may additionally store and utilize a decentralized eSIM (i.e., a dSIM), which may offer additional functionality. Specifically, in addition to a traditional Network Access Application (NAA) 100 for 4G/LTE and 5G authentication, the dSIM may additionally include a Decentralized Access Application (DAA) 101 to enable secure interaction with other entities in the decentralized mobile network, as well as a Proof of Coverage Application (PCA) 102 and a Quality of Service Application (QSA) 103 that, together, facilitate the measurement of network integrity for the benefit of the various parties that utilize the decentralized mobile network.

Automating interaction of the various operators, network nodes, and user equipment 110 is a blockchain system comprising a set of blockchain protocols 140 (which may be based on, e.g., Solana, Cardano, Algorand, Ethereum, or a custom blockchain). The user equipment 110 may also host a single-chain or multi-chain wallet that enables interaction with the blockchain protocols 140. Similarly, the multi-chain bridge 130 may provide a seamless interface between the various operators and the various blockchain protocols 140 used by the blockchains utilized throughout the decentralized mobile network.

Figure 2:
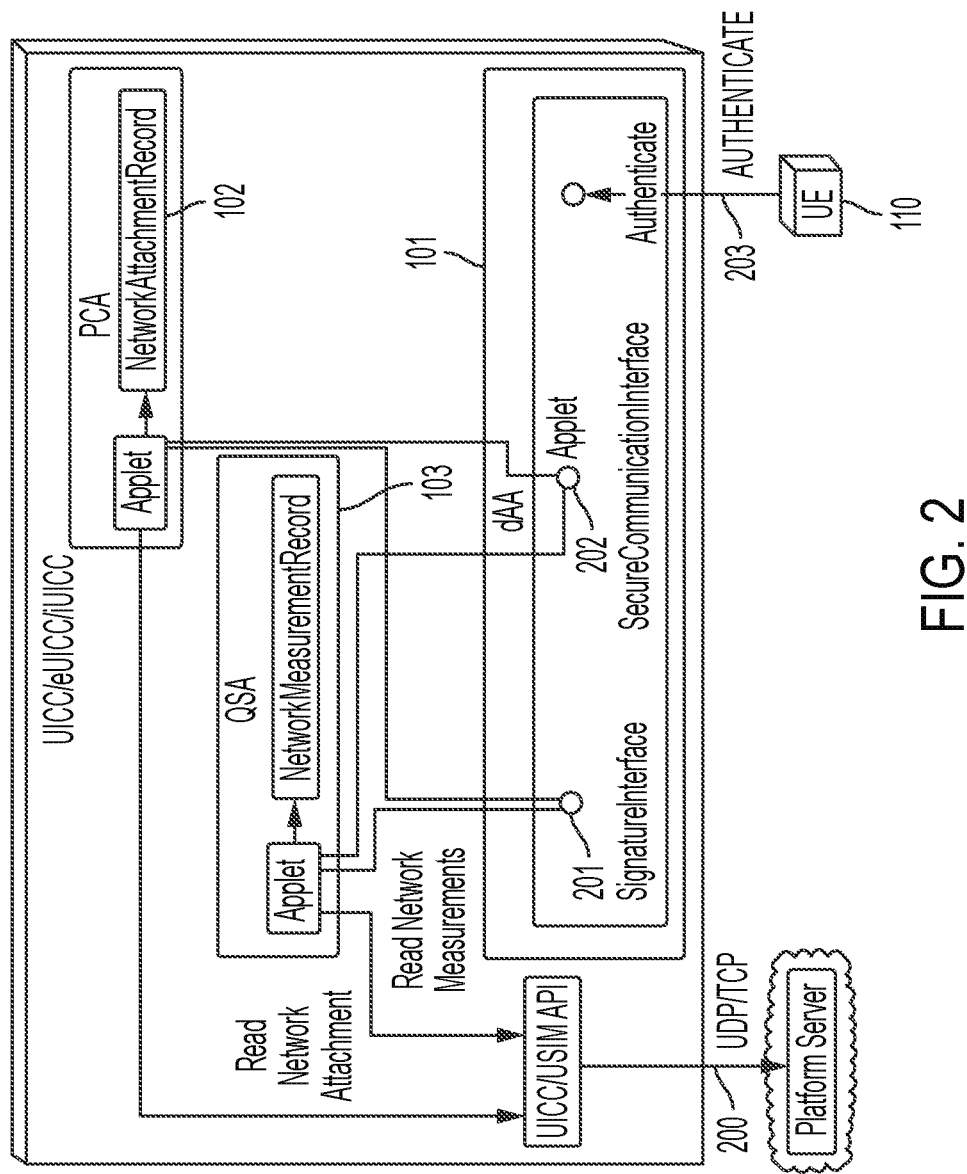
FIG. 2 illustrates additional details of a dSIM incorporated in a UICC/eUICC/iUICC of a user equipment, in accordance with some embodiments of the present disclosure.

FIG. 2 illustrates additional details of a dSIM incorporated in a UICC/eUICC/iUICC of a user equipment, in accordance with some embodiments of the present disclosure. The dSIM as further illustrated in FIG. 2 consists of intertwined (i.e. shared resources and interfaces) Java Card applications (known as Java Card applets) such as Proof-of-Coverage Application (PCA) 102, Quality-of-Service Application (QSA) 103, Network Access Application (NAA) and Decentralized Access Application (dAA) 101 stored in a tamper-resistant area of a user equipment 110. The multi-chain bridge (also referred to Platform Server in the context of an offloading system), PCA 102 and QSA 103 are described in detail in disclosures associated with U.S. Provisional Patent Application Ser. Nos. 63/348,497 and 63/402,949. Although the NAA 100 and dAA 101 were also described in these previous disclosures, additional details are provided herein for these two components.

In FIG. 2, the dSIM may communicate with the Platform Server utilizing an interface 200 (e.g., UDP/TCP). The dSIM may communicate with the UE utilizing an interface 203 for authentication purposes. The dSIM may include interfaces and resources shared amongst dSIM applications (i.e., dAA 101, QSA 103 & PCA 102), such as a signature interface 201 and a secure communications interface 202.

Figure 3:
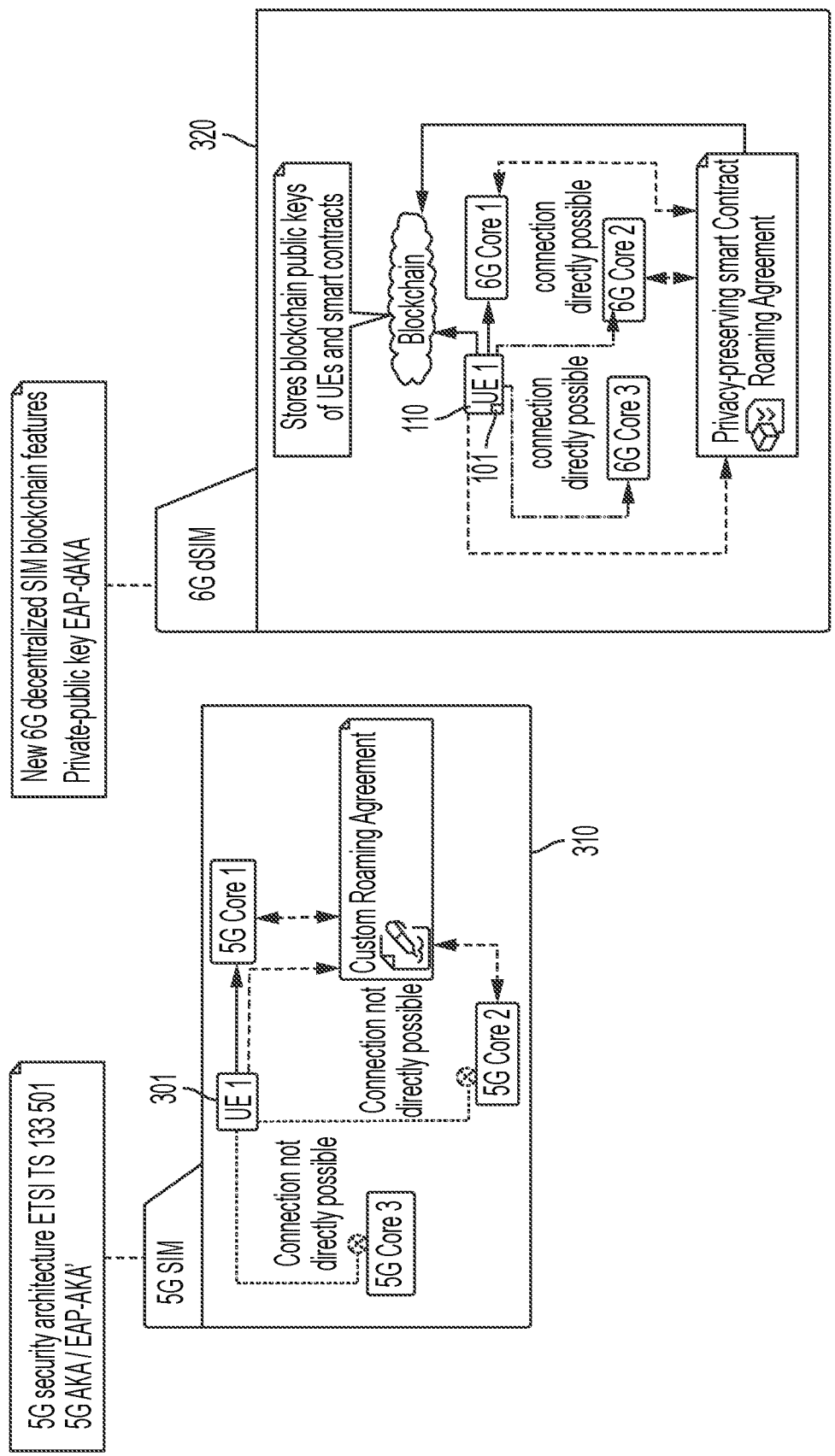
FIG. 3 illustrates additional details of network infrastructures incorporating a dSIM, in accordance with some embodiments of the present disclosure.

FIG. 3 illustrates additional details of network infrastructures incorporating a dSIM, in accordance with some embodiments of the present disclosure. At a high level and as illustrated in FIG. 3, the NAA 301 may be used in existing security architectures 310, while, in embodiments according to the present disclosure, the dAA 101 is proposed for a new security architecture 320.

Figure 4:
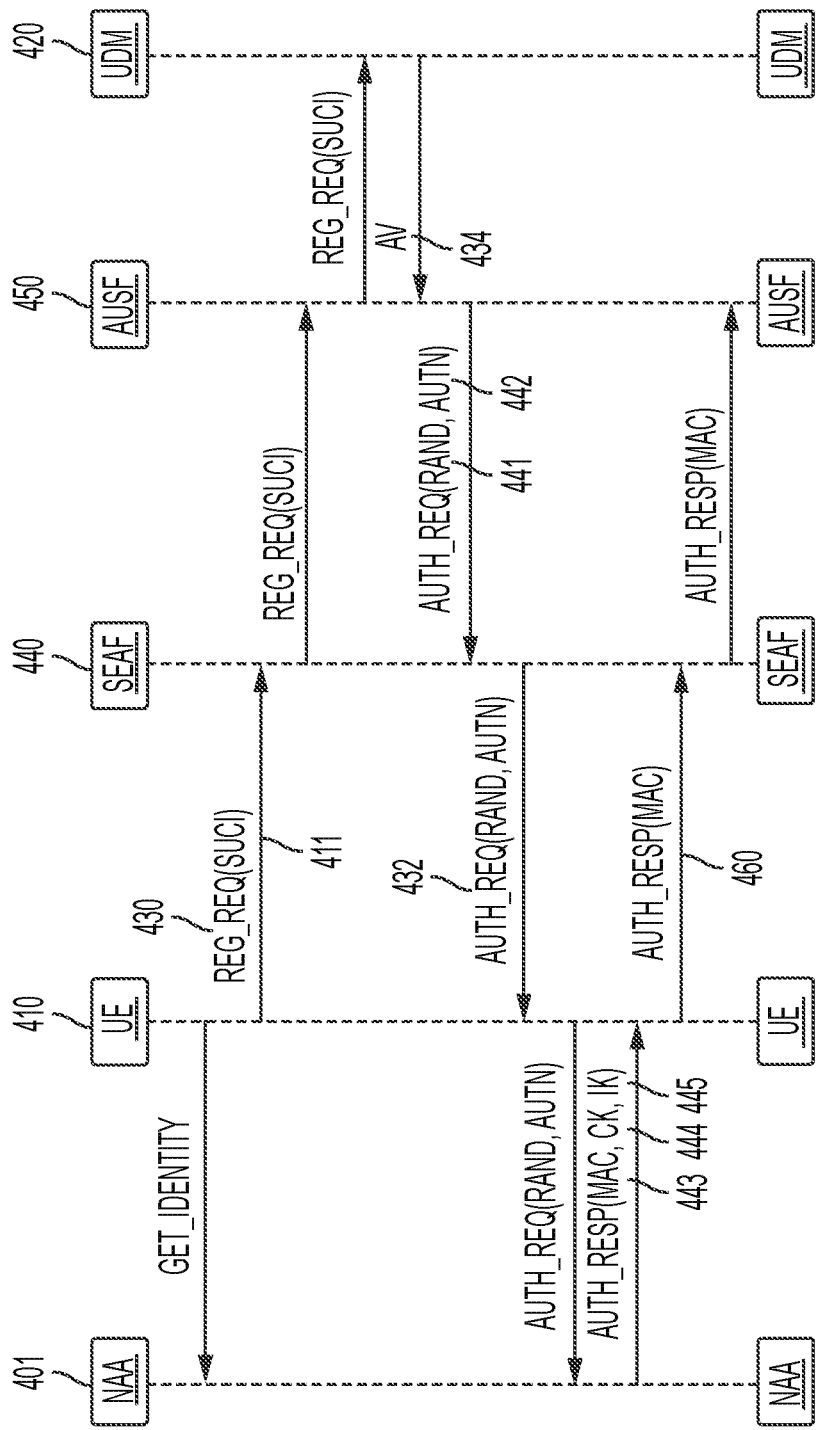
FIG. 4 illustrates a standard-based 5G symmetric authentication protocol.

FIG. 4 illustrates a standard-based 5G symmetric authentication protocol. Whenever a UE connects to a newly detected or different mobile network, an authentication and key agreement (AKA) procedure is performed as illustrated in FIG. 4. At least one network access application (NAA) 401 is installed inside the UICC (or eUICC or iUICC) of a user equipment 410. This NAA 401 can be a UMTS SIM (USIM) or IP Multimedia Services SIM (ISIM) application. Both NAA 401 and home network core's Unified Data Management (UDM) 420 use common symmetric keys Ki and OPc usually with a 128-bit key length which is used together with the MILENAGE algorithm or TUAK algorithm for the encryption/decryption and calculation of integrity proofs as message authentication codes (MAC).

The NAA 401 holds an internal sequence counter which may be in sync with the value stored in the UDM 420. The UE 410 starts a registration request 430 submitting a Subscription Concealed Identifier (SUCI) 411 to the Security Anchor Function (SEAF) 440. The SUCI 411 prevents that the subscriber identity associated with the UICC/eUICC/iUICC (e.g., IMSI) is leaked over the unsecured mobile radio interface layer during the authentication.

After the UDM 420 has decrypted the SUCI 411, the UE 410 receives an authentication request 432 from the SEAF 440. In parallel when the authentication request 432 is sent, the network core's UDM Authentication Credential Repository and Processing Function (ARPF) also generates an authentication vector (AV) 434 for the connecting NAA 401 containing a random value (RAND 441), an authentication token (AUTN) 442, and a pair with a computed cipher key (CK) and integrity key (IK).

This data is sent to the Authentication Server Function (AUSF) 450 which verifies the UICC's response later. The SEAF 440 sends the RAND 441 and AUTN 442 to the UE 410. The AUTN 442 contains the home network's MAC, which takes as one of its inputs the current sequence counter. The NAA 401 verifies the MAC and checks if the sequence counter matches an expected range of the internal counter. If the check succeeds, the NAA 401 computes a MAC 443, CK 444, and IK 445 using the RAND 441.

The authentication response 460 from the NAA 401 is forwarded by the SEAF 440 to the AUSF 450 for verification. When the AUSF 450 successfully verifies the MAC 443, it is considered that both NAA 401 and home network (i.e., UDM 420) have mutually authenticated via symmetric cryptography. The CK 444 and IK 445 created during the authentication process is then taken by the AUSF 450 to compute an anchor key K_AUSF which in turn is used to derive a key K_SEAF which is processed by the SEAF 440 and the UE 410 to derive session keys for protecting the integrity and confidentiality of the communication. There are two options on how to execute this authentication flow: EAP-AKA' and 5G AKA which mostly differentiate from how the authentication messages are wrapped.

Figure 5:
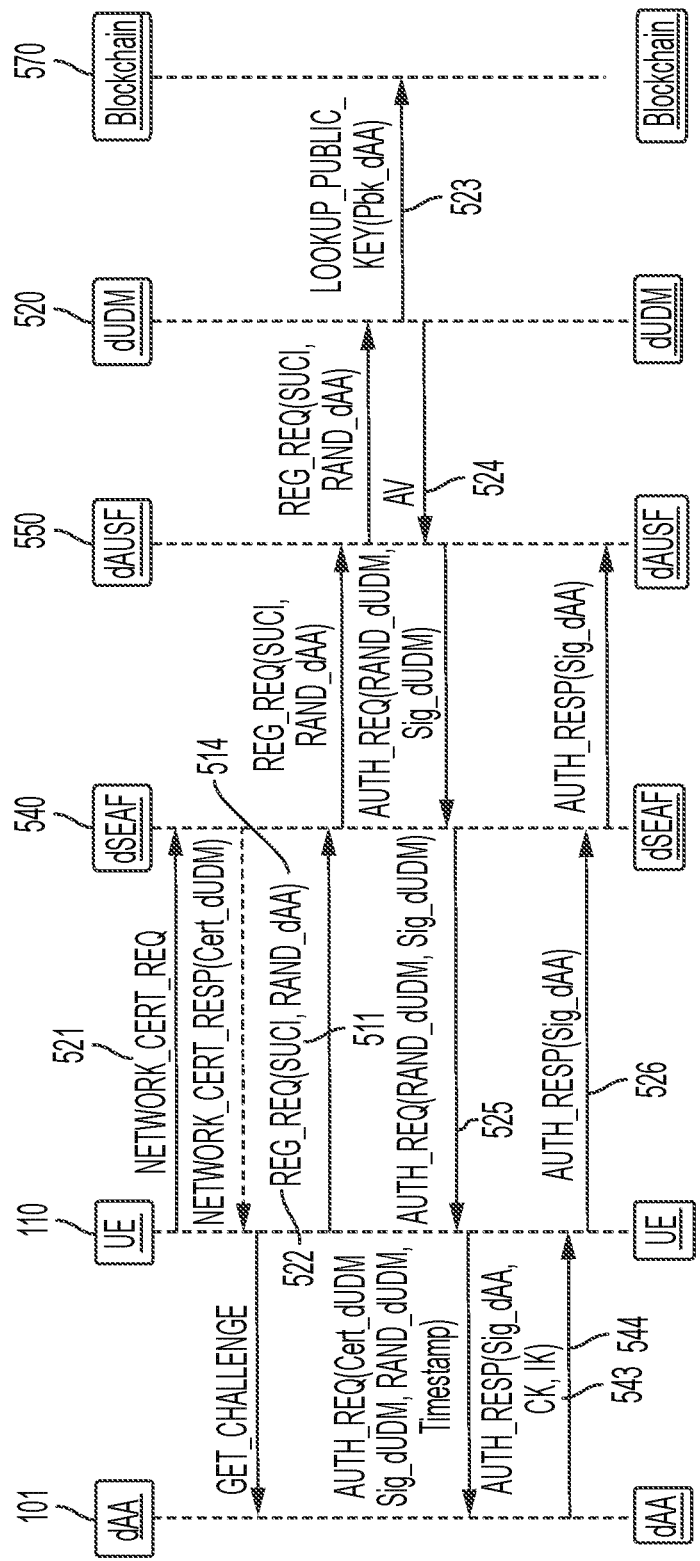
FIG. 5 illustrates a decentralized authentication approach using asymmetric authentication for a 6G environment, in accordance with some embodiments of the present disclosure.

FIG. 5 illustrates a new decentralized authentication approach using asymmetric authentication via a 6G EAP-dAKA (decentralized AKA) mechanism (or a similar mechanism using a mutual authentication method with asymmetric keys including a key agreement such as EAP-TLS), in accordance with some embodiments of the present disclosure. A description of elements of FIG. 5 that have been previously described will be omitted for brevity. The approach of FIG. 5 addresses existing challenges and enables an interoperable decentralized ecosystem architecture. Instead of sharing symmetric secret keys Ki and OPc between NAA 401 and UDM 420, the 6G EAP-dAKA uses a public key infrastructure (PKI) using asymmetric cryptography backed by a blockchain 570. The NAA 401 is replaced by a decentralized network access application (dAA) 101 using a public key published on a blockchain 570 (e.g., as a non-fungible token or semi-fungible token) for the authentication of the dAA 101 by a given decentralized network access node. In this embodiment, a decentralized mobile network may therefore publish a public key on a given blockchain 570 for enabling all decentralized network access nodes at the edge to perform mutual authentication with a dAA 101 instance. It is worth noting that even though 5G standards do introduce asymmetric cryptography at the encryption level for the SUCI 411, the actual authentication process remains symmetric. 5G does not use a full PKI mechanism but only an isolated public private keypair defined by the MNO for the purpose of privacy-preserving of subscriber identities.

It is also important to note that in the context of 4G/LTE security architecture, the proposed approach is very similar to the 5G security architecture except that some components' names and functional responsibilities are changed (e.g., 5G's UDM 420 is 4G's HSS). It is also noted that 4G/LTE uses the subscriber identifier (i.e., IMSI) as plain text, and not the SUCI 411 as a protection mechanism.

The home network creates an elliptic curve (EC) cryptography keypair using the curve secp256r1 consisting of the public key PbK_dUDM and the private key PrK_dUDM owned by the decentralized UDM (dUDM) 520. The PrK_dUDM stays secret and never leaves the dUDM 520. The PbK_dUDM is published on the blockchain 570 together with an X.509 certificate Cert_dUDM signed by a trusted certification authority (CA) to allow UEs 110 to validate the PbK_dUDM. The blockchain 570 could also store smart contracts for offloading agreements between the home network and other networks. The dAA 101 is installed inside the UICC (or eUICC or iUICC) as part of the dSIM profile.

The dAA 101 generates during the first startup process an EC keypair using the curve secp256r1. The keypair consists of an internally stored private key (PrK_dAA) and a public key (PbK_dAA). The PrK_dAA may not leave the tamper-resistant UICC and may remain secret. The PbK_dAA is published on a blockchain with an X.509 certificate Cert_dAA related to the issuing home network and attesting the PbK_dAA by a signature of a Personalization Server (PS) which a part of the OTA Engine 107. The PS acts as an (intermediate) CA for the attestation of dAAs 101. The curve secp256r1 may be used since it is a standard curve supported by existing UICCs and the Java Card Signature API. However, it is worth noting that the proposed authentication protocol is not limited to the usage of EC cryptography and the curve secp256r1. Different cryptographic algorithms more applicable to post quantum cryptography may be utilized as long as they are supported by concerned components.

The UE 110 requests from the decentralized SEAF (dSEAF) 540 the Cert_dUDM and its certification path of the serving network using a new message type NETWORK CERTIFICATE REQUEST 521. The UE 110 checks the Cert_dUDM against a list of trusted certificates and CAs. These certificates can be stored inside the dAA's file system and are read by the UE 110. If enabled, the subscriber may edit these certificates and for instance add other trusted certificates and CAs. If a trust relationship can be created, the UE 110 continues with the authentication.

The UE 110 requests a random value RAND_dAA from the dAA as a challenge for the dUDM. The UE 110 starts a registration request 522 by passing the SUCI 511 and the RAND_dAA 514 to the dSEAF 540. The SUCI 511 encrypts the Cert_dAA by using the PbK_dUDM of the serving network. The dUDM 520 decrypts the SUCI 511 and validates the Cert_dAA. Other information about the issuing home network and smart contracts with other networks can also be considered. The dUDM's decentralized ARPF (dARPF) creates a signature Sig_dUDM for the RAND_dAA. Based on the PrK_dUDM and PbK_dAA a key dKi is computed by the dARPF using Elliptic Curve Diffie-Hellman (ECDH). The dKi is used to derive CK and IK which are applied in the same way as in the 5G security architecture to compute an anchor key K_AUSF which in turn is used to derive a key K_SEAF which is processed by the dSEAF 540 and the UE 110 to derive session keys for providing data integrity and confidentiality. The Sig_dUDM, CK, IK from the AV may be sent 524 to the decentralized AUSF (dAUSF) 550. The dSEAF 540 sends 525 the RAND_dUDM and Sig_dUDM to the UE 110. The dAA 101 validates the Sig_dUDM against the Cert_dUDM and the initially provided RAND_dAA. The dAA 101 also derives CK 543 and IK 544 by using ECDH in the same way as the dARPF using PbK_dUDM and PrK_dAA. The dAA 101 creates a signature Sig_dAA for the provided challenge RAND_dUDM and other parameters building a certificate Cert_Auth_dUDM which is later used as authentication token. The UE 110 sends 526 the Sig_dAA to the dSEAF 540 and the dAUSF 550 validates Sig_dAA against the provided RAND_dUDM and Cert_dAA. This proposed protocol may utilize modifications to software of the UICC/eUICC/iUICC (e.g., dSIM), UE's baseband processor 104, gNB 105 (or dNB as a decentralized gNB) and mobile network core components 106 (e.g., dUDM 520).

Figure 6:
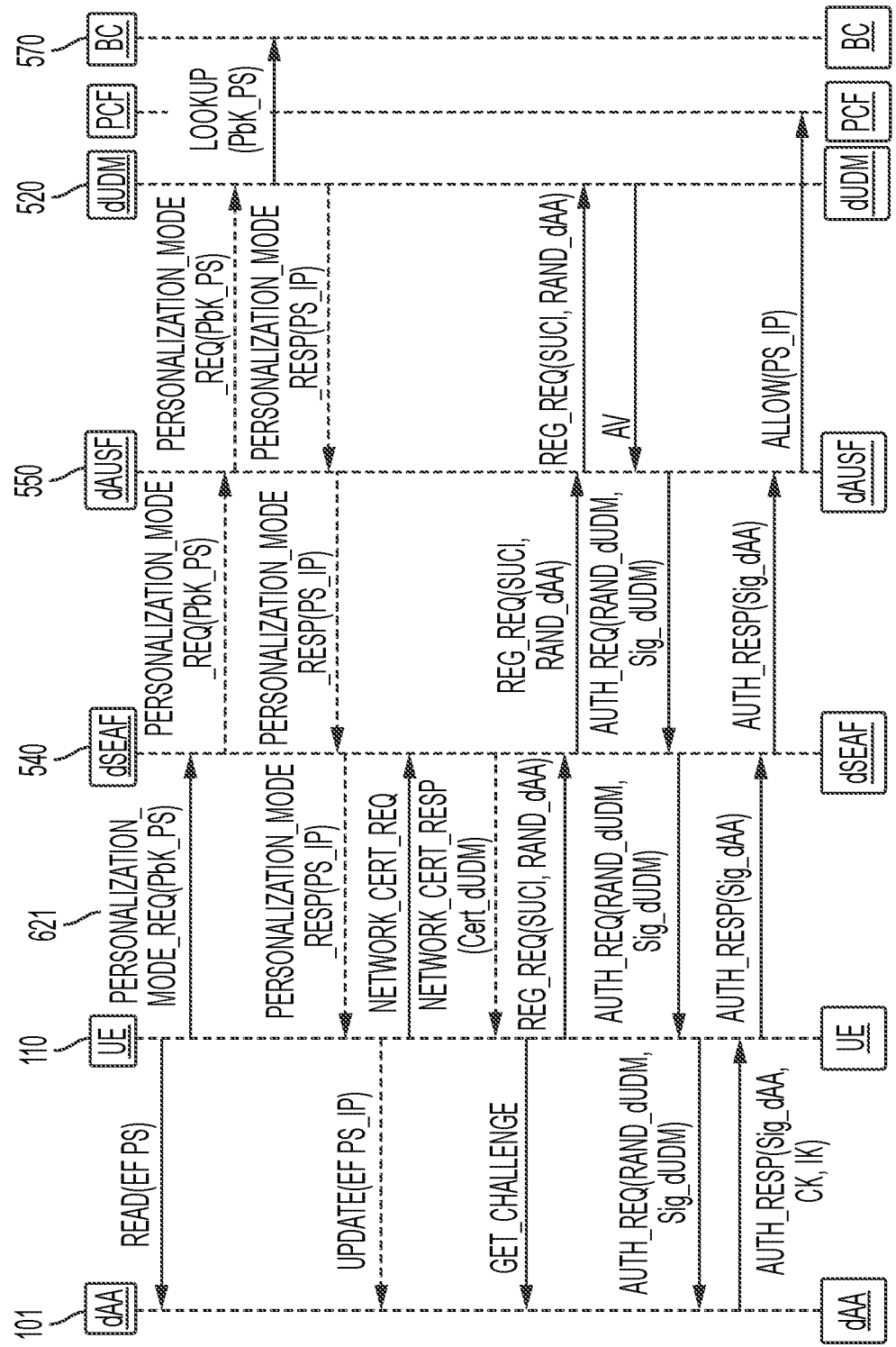
FIG. 6 illustrates a personalization initialization, in accordance with some embodiments of the present disclosure.

FIG. 6 illustrates a personalization initialization, in accordance with some embodiments of the present disclosure. A description of elements of FIG. 6 that have been previously described will be omitted for brevity. An initialization of the personalization process, as illustrated in FIG. 6, may be utilized when the dSIM is first downloaded and activated. After the dAA 101 generates the EC keypair, this keypair is not yet published on the blockchain 570 and the dUDM 520 cannot validate the Sig_dAA. A personalization procedure may be therefore executed first by the personalization server (PS) to register the PbK_dAA, create the Cert_dAA and publish the PbK_dAA with the Cert_dAA to the blockchain 570. In order to execute the personalization procedure, the dAA 101 may access the PS, with a success of the first authentication allowing a restricted (bootstrap) connectivity to the PS. For this purpose, the UE 110 uses a new message type PERSONALIZATION_MODE_REQUEST 621 and passes the public key of the PS (PbK_PS) stored in the dAA 101. The dUDM 520 switches into the personalization mode and looks up the X.509 certificate Cert_PS including the IP address of the PS on the blockchain 570. The IP address of the PS is returned to the UE 110 and stored in the dAA 101. During the initial authentication flow, the dUDM 520 neither looks up nor validates the Cert_dAA on the blockchain 570. After the dAA 101 validates the Sig_dUDM and returns the Sig_dAA, the signature may be validated against the PbK_dAA as Cert_dAA does not exist yet. The policy control function (PCF) is used to restrict the connectivity to the IP address of the PS.

Figure 7A:
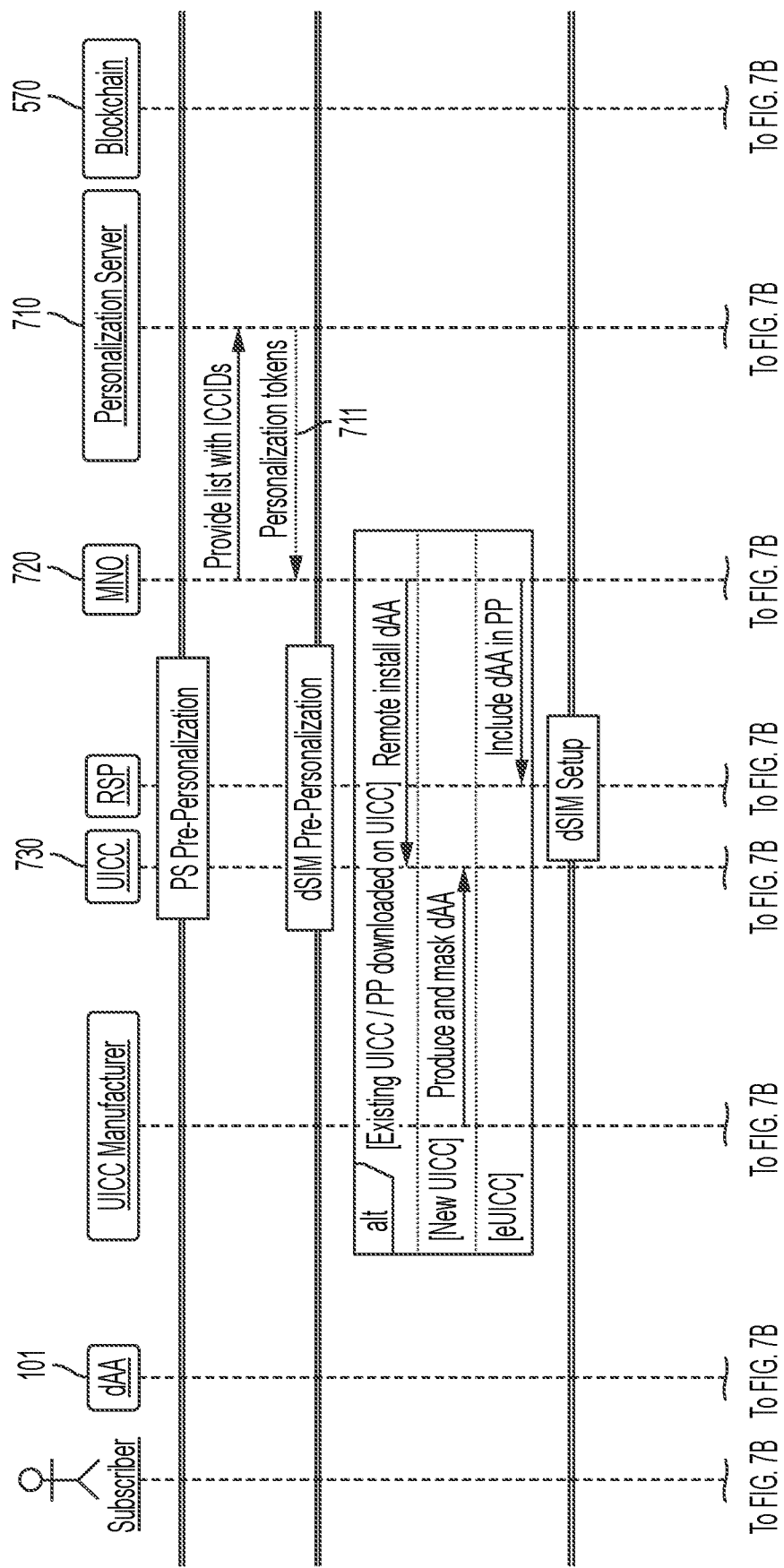
FIGS. 7A and 7B illustrate a personalization protocol, in accordance with some embodiments of the present disclosure.
Figure 7B:
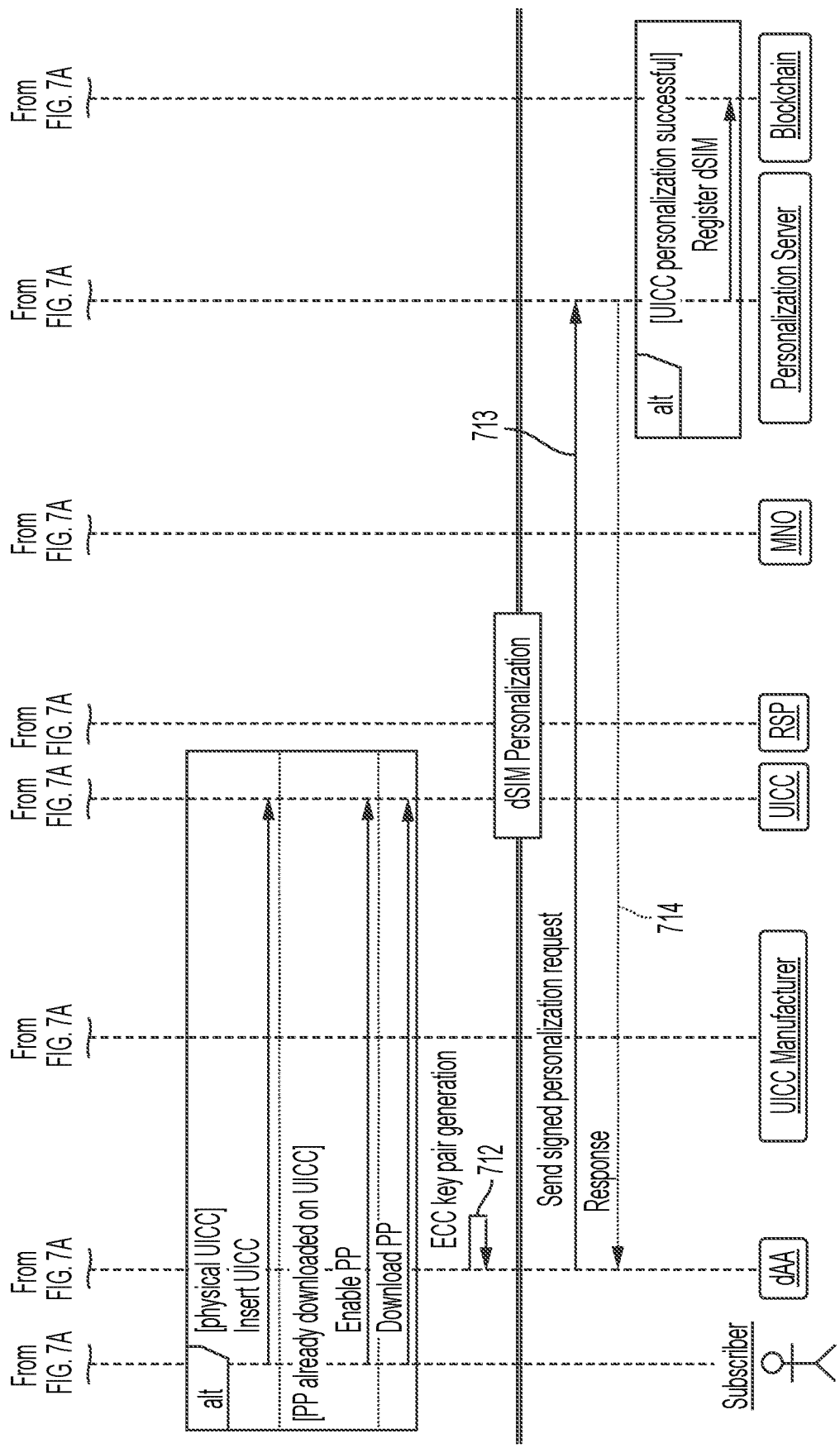

FIGS. 7A and 7B illustrate a personalization protocol, in accordance with some embodiments of the present disclosure. A description of elements of FIGS. 7A and 7B that have been previously described will be omitted for brevity. Once the initialization of the personalization procedure is successful, the actual personalization protocol as illustrated in FIGS. 7A and 7B may be performed. The PS 710 receives a list with the ICCIDs of the dSIM to be personalized from the MNO 720. The PS 710 will create personalization tokens (PT) 711. The PT 711 is a secret key which will be used as an access token and for the derivation of a secure channel key. The PT 711 is returned to the MNO 720 and may be treated as sensitive data. The dAA 101 and the PT 711 may be included in the dSIM pre-personalization of the UICCs/eUICCs/iUICCs 730. Depending on the UICC technology that is used, the UICC 730 is inserted into a UE 110 or downloaded or enabled. After the first selection of the dAA 101, the dAA 101 creates 712 an EC keypair. The dAA 181 will be attached to a decentralized network by using the authentication personalization protocol. After the dAA 191 is notified by the UE 110 that a network connection was successful, a channel is opened to the PS 710. The dAA 101 sets up a secure channel key by using HKDF or a similar key derivation scheme. The dAA 101 uses a counter together with AES-CCM to encrypt and authenticate the data sent to the PS 710. The dAA uses this secure channel to send 713 the ICCID, the public key PbK_dAA, the PT 711 and a timestamp to the PS 710. If the PS 710 can validate the ICCID, PT 711 and the timestamp, the PS 710 creates a certificate for the dAA (Cert_dAA) and publishes it on the blockchain 570. The dAA 101 receives a response 714 over the secure channel and will reset the dSIM. After the reset a standard authentication protocol can be executed and the dUDM 520 can validate the Cert_dAA.

The previously described 6G approach (i.e., post-5G) is one embodiment of the concept. However, it may include important modifications to various components in the mobile network infrastructure including the UE's baseband processor's firmware and radio access networks (RANs). An intermediate solution is proposed that leverages existing UEs 110 with their built-in baseband processors (i.e., without new modem firmware) and existing RANs (i.e., without changing cell towers' firmware). This intermediate solution has the benefits of being cost-effective and rapidly deployable to existing 5G and even 4G/LTE networks. It is appreciated that from a technical and business standpoint that it is much easier to update both dAA 101 and dUDM 520 than the firmware of UEs 110 and RANs as suggested by the 6G approach. However, the backward compatibility mode includes non-conventional steps to implement.

The backward compatibility mode for 5G is described hereafter. It is noted that it is relatively similar for backward compatible mode for 4G/LTE. One difference is that some components do not have the same names (e.g., UDM 420 for 5G and HSS for 4G/LTE) and some functional responsibilities may differ. It is also noted that 4G/LTE does not use the concept of SUCI 411 as a protection mechanism, but utilizes the subscriber identifier (i.e., IMSI) in plain text.

In order to be able to reuse existing UEs 110 and RANs, the message formats and protocols used inside the baseband processor of the UE 110 and on the mobile radio interface layer of the RAN may stay the same. Hence, registration request, authentication request and corresponding responses have to be executed in the same manner with existing messages. The message content for the authentication request coming from the SEAF 440 is the tuple RAND 441 and AUTN 412 each having 16 bytes. The authentication response is 4 bytes, but in case the sequence number is incorrect, a synchronization failure message AUTS is reported. The AUTS encrypts the correct sequence number with a cipher function using the key Ki. AUTS has 16 bytes. The behavior of the UDM 420 is to decrypt the AUTS and restart the authentication with the correct sequence number.

Figure 8A:
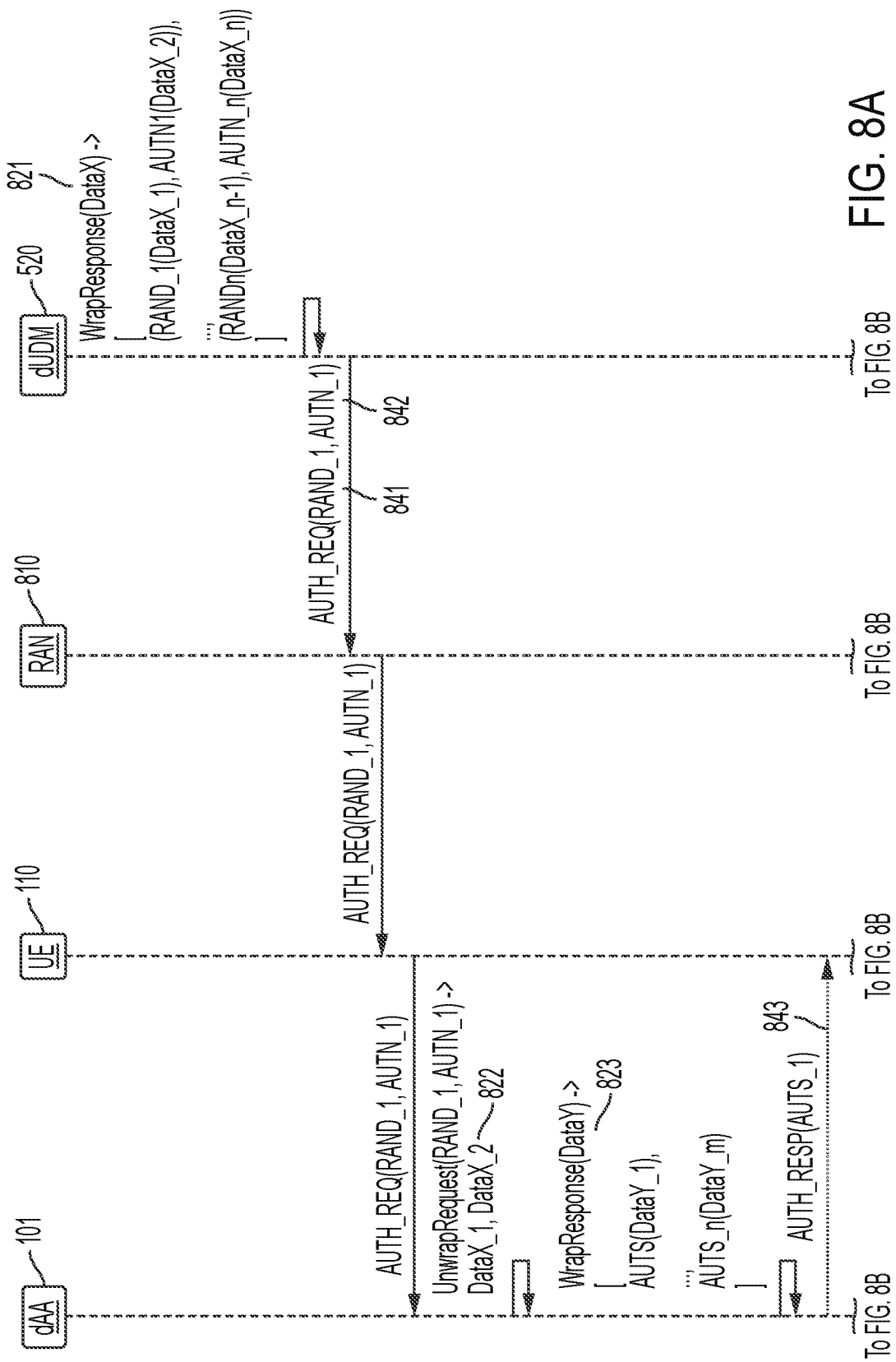
FIGS. 8A and 8B illustrate a tunneling mechanism of authentication messages, in accordance with some embodiments of the present disclosure.
Figure 8B:
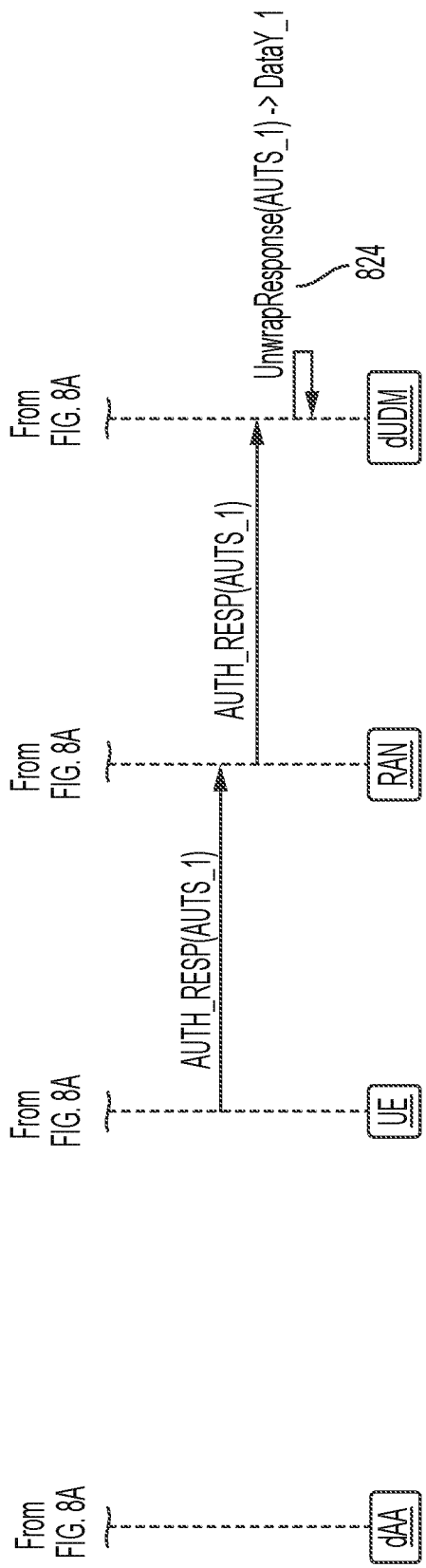

This protocol can be leveraged to piggyback the authentication messages for the EAP-dAKA between a modified decentralized network core (e.g., dUDM 520) and the dAA 101. FIGS. 8A and 8B illustrate a tunneling mechanism of authentication messages, in accordance with some embodiments of the present disclosure. A description of elements of FIGS. 8A and 8B that have been previously described will be omitted for brevity. In order to accomplish this backward compatibility, the tunneling mechanism of authentication messages as summarized in FIGS. 8A and 8B is implemented. This tunneling mechanism piggybacks existing messaging structure (e.g., FIG. 4) while adding mechanisms to accommodate asymmetric encryption, as described herein.

Referring to FIG. 8A, the dUDM 520 wraps 821 up data into multiple data packets having the same size as the RAND 441 and AUTN 442 content (see FIG. 4), illustrated in FIG. 8A as RAND_1 841 and AUTH_1 842. Since RAND 441 and AUTN 442 are not interpreted by the RAN 810 and the baseband processor of the UE 110 they are transparently routed to the dAA 101. The dAA 101 unwraps 822 the RAND and AUTN content (e.g., RAND_1 841, AUTN_1 842) and interprets the data according to the session state of the authentication protocol. For sending responses the AUTS message content is utilized and the dAA 101 wraps 823 any data into multiple data packets having the size of AUTS, illustrated as AUTS_1 843 in FIG. 8A. For the baseband processor of the UE 110 and the RAN 810, the data is transparent. As illustrated in FIG. 8B, the dUDM 520 unwraps 824 the data and interprets it also according to the session state of the authentication protocol. The wrapping and unwrapping of the data could also be handled by the SEAF directly to simplify the passing of data. The exchange of wrapped RAND and AUTN requests and AUTS responses may be repeated until all data is sent. If one end of the connection has no data to send empty data (e.g., only zeroes) are used as empty payloads.

A drawback of this approach is a slightly increased number of messages to be exchanged between the decentralized mobile network and the UE 110. The tunneling protocol may possibly add a few hundred milliseconds to the first network attachment process which should be acceptable considering that a network attachment is done only once within a network and includes in any case a network scan which relatively takes much longer.

Figure 9:
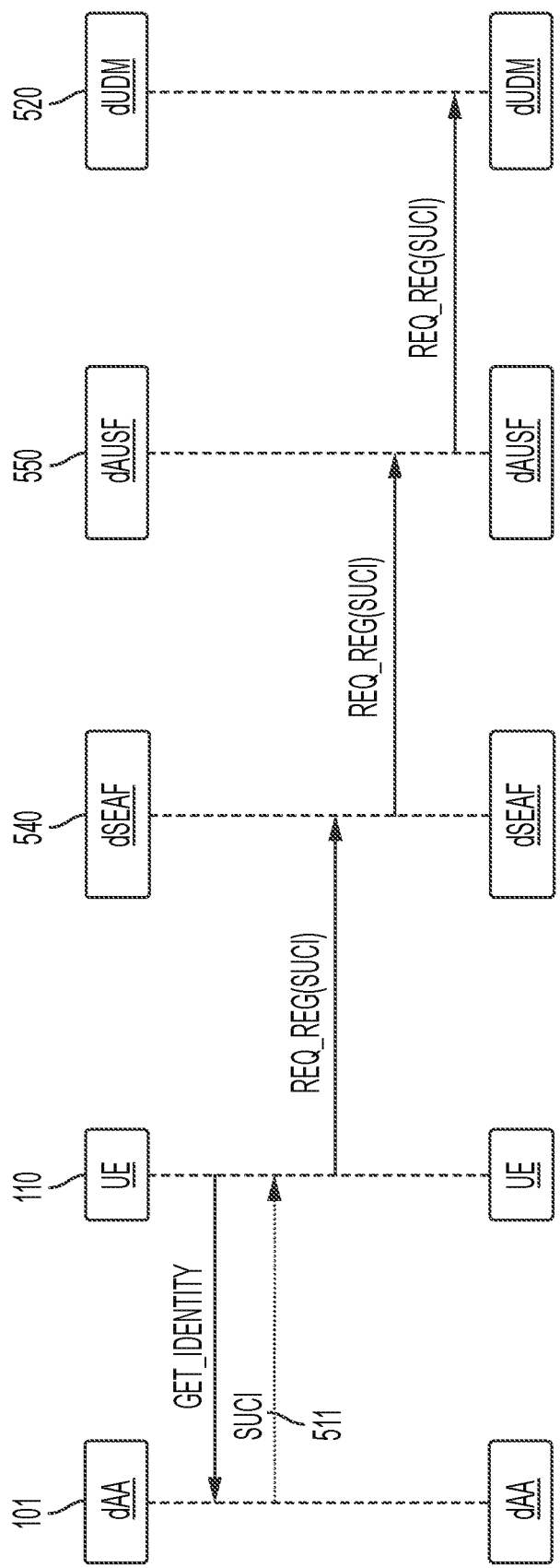
FIG. 9 illustrates a registration process, in accordance with some embodiments of the present disclosure.

FIG. 9 illustrates a registration process, in accordance with some embodiments of the present disclosure A description of elements of FIG. 9 that have been previously described will be omitted for brevity. As illustrated in FIG. 9, the UE 110 starts with a registration request including the SUCI 511 of the dAA 101. Since the serving network is unknown, the SUCI 511 is encrypted with the Home Network Public Key according to the standard 5G security architecture. A flag in an unused byte of the routing indicator as part of the SUCI 511 can be used to mark the UICC (or eUICC or iUICC) as dSIM-compatible. If the authentication request is received by the home network's UDM the SUCI can be decrypted and if this UDM supports a dSIM and the routing indicator flag is set the UDM can use the EAP-dAKA. If this flag is not set the home network's UDM will use the classical AKA. If the visited network supports the dSIM protocol, the dUDM 520 ignores the SUCI 511 since it cannot decrypt it and execute the EAP-dAKA. Otherwise, the visited network uses offloading integration and connect to the home network's UDM if the operator is supported or else the authentication is rejected.

Figure 10:
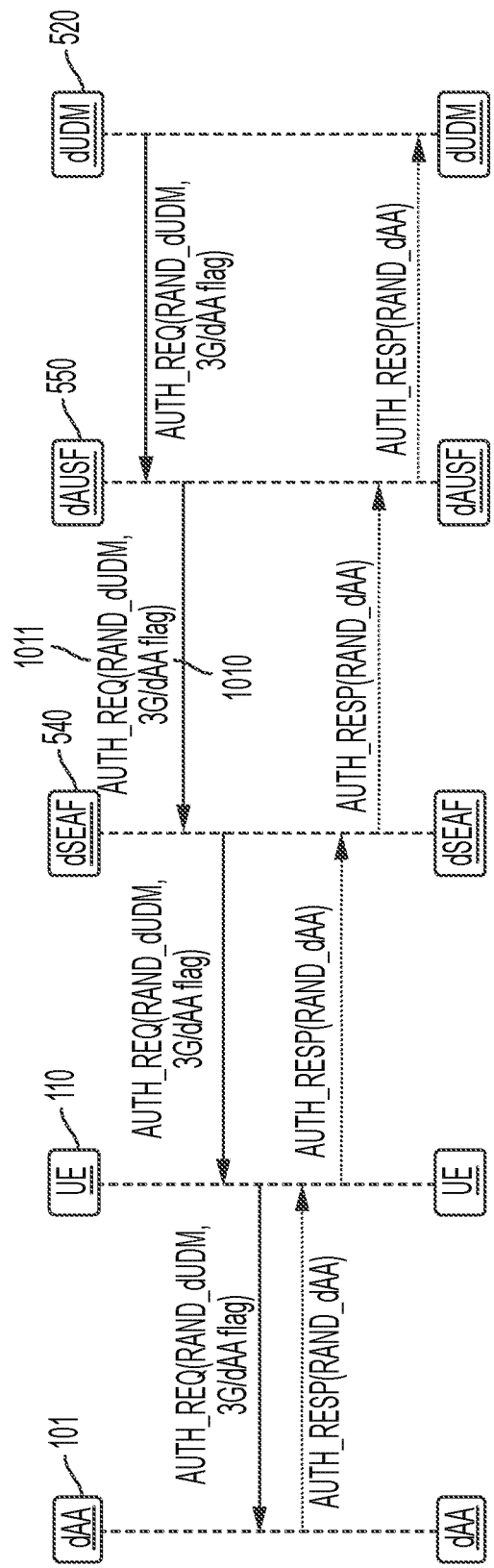
FIG. 10 illustrates a challenge randomization process, in accordance with some embodiments of the present disclosure.

FIG. 10 illustrates a challenge randomization process, in accordance with some embodiments of the present disclosure. A description of elements of FIG. 10 that have been previously described will be omitted for brevity. As illustrated in FIG. 10, the dUDM 520 creates a random value RAND_dUDM for the dAA 101 as a challenge to be signed to validate the latter provided public key identity of the dAA 101. The dSEAF 540 is sending the authentication request to the UE 110. The RAND_dUDM is tunneled using the RAND parameter of the authentication request message. In addition, a 3G/dAA flag 1010 is sent in the AUTN parameter of the authentication request 1011. The 3G/dAA flag 1010 may be a special value (e.g., just zeroes, which is not expected in classical AKA). A conventional UICC (or eUICC or iUICC) may fail while validating the AUTN parameter, in which case the network will fall back to classical AKA and restart the authentication. A dAA 101 can understand the 3G/dAA flag 1010 and will continue with the EAP-dAKA. If the 3G/dAA flag 1010 is not set the dAA 101 will continue with classical AKA and use the Ki and the OPc.

Figure 11:
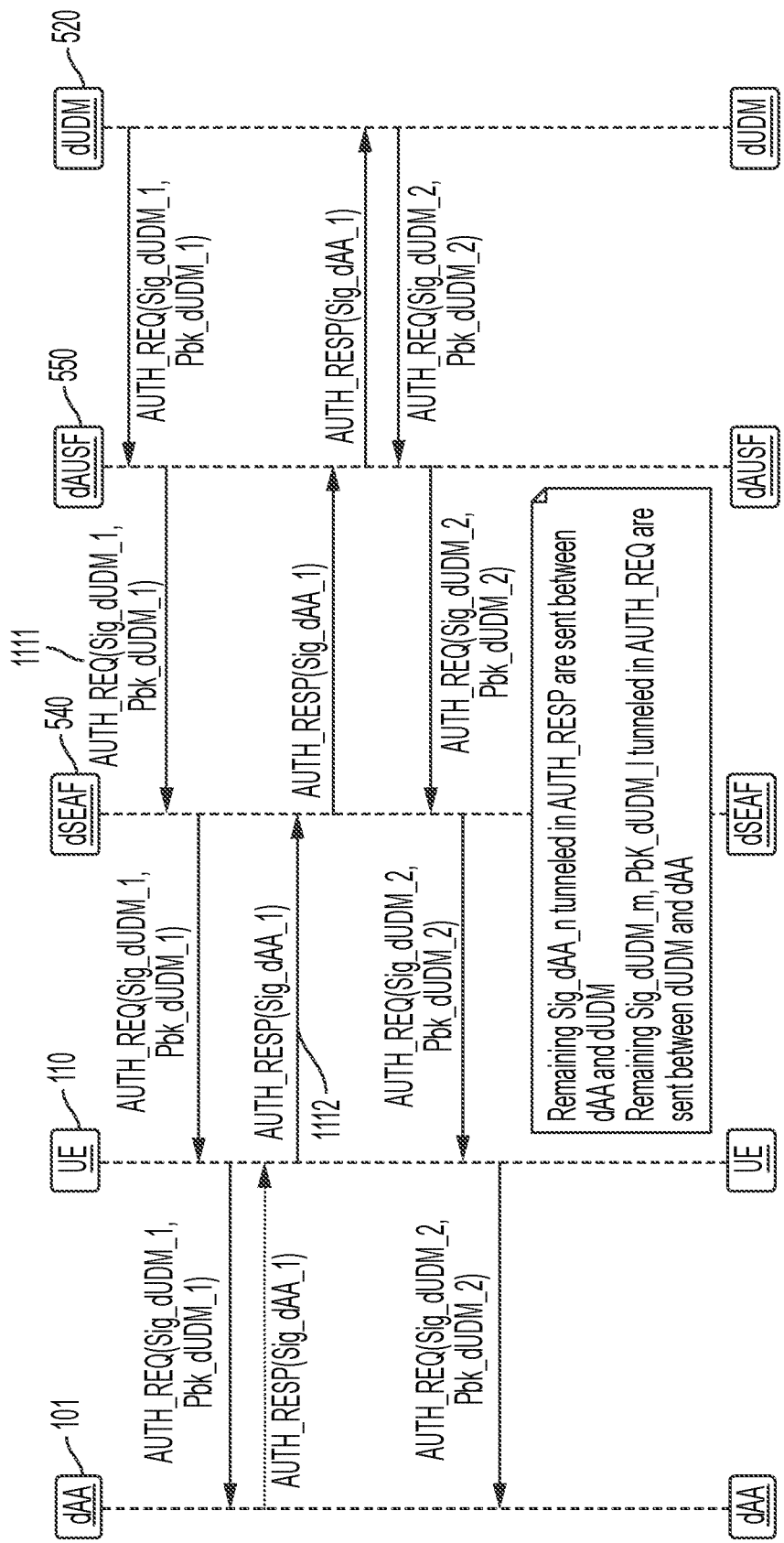
FIG. 11 illustrates a dUDM signature mechanism, in accordance with some embodiments of the present disclosure.

FIG. 11 illustrates a dUDM signature mechanism, in accordance with some embodiments of the present disclosure. A description of elements of FIG. 11 that have been previously described will be omitted for brevity. As illustrated in FIG. 11, the dUDM's dARPF creates a signature Sig_dUDM for the received RAND_dAA challenge tunneled in the authentication response AUTS message. The dSEAF 540 sends the Sig_dUDM and PbK_dUDM to the UE 110. The PbK_dUDM is utilized by the dAA 101 later to validate the Sig-dUDM. Since a 256-bit public key may have 64 bytes to be transferred, several authentication request messages may be utilized to transfer the PbK_dUDM, and similarly for the Sig_dUDM. Examples of these messages are illustrated using the AUTH_REQ interface passing a Sig_dUDM_1, PbK_dUDM_1 in one tunnel transmission and Sig_dUDM_2, PbK_dUDM_2 in another tunnel transmission. The PbK_dUDM is tunneled using the RAND parameter and the Sig_dUDM is tunneled using the AUTN parameter in the authentication request message 1111. When the first authentication message of this block arrives in the dAA 101, the dAA 101 creates a signature for the previously received RAND_dUDM challenge. The dAA 101 sends 1112 the Sig_dAA in the authentication response AUTS message. Since the signature requires 64 bytes, 4 authentication responses may be utilized, though all of these authentication responses are not illustrated in FIG. 11.

Figure 12:
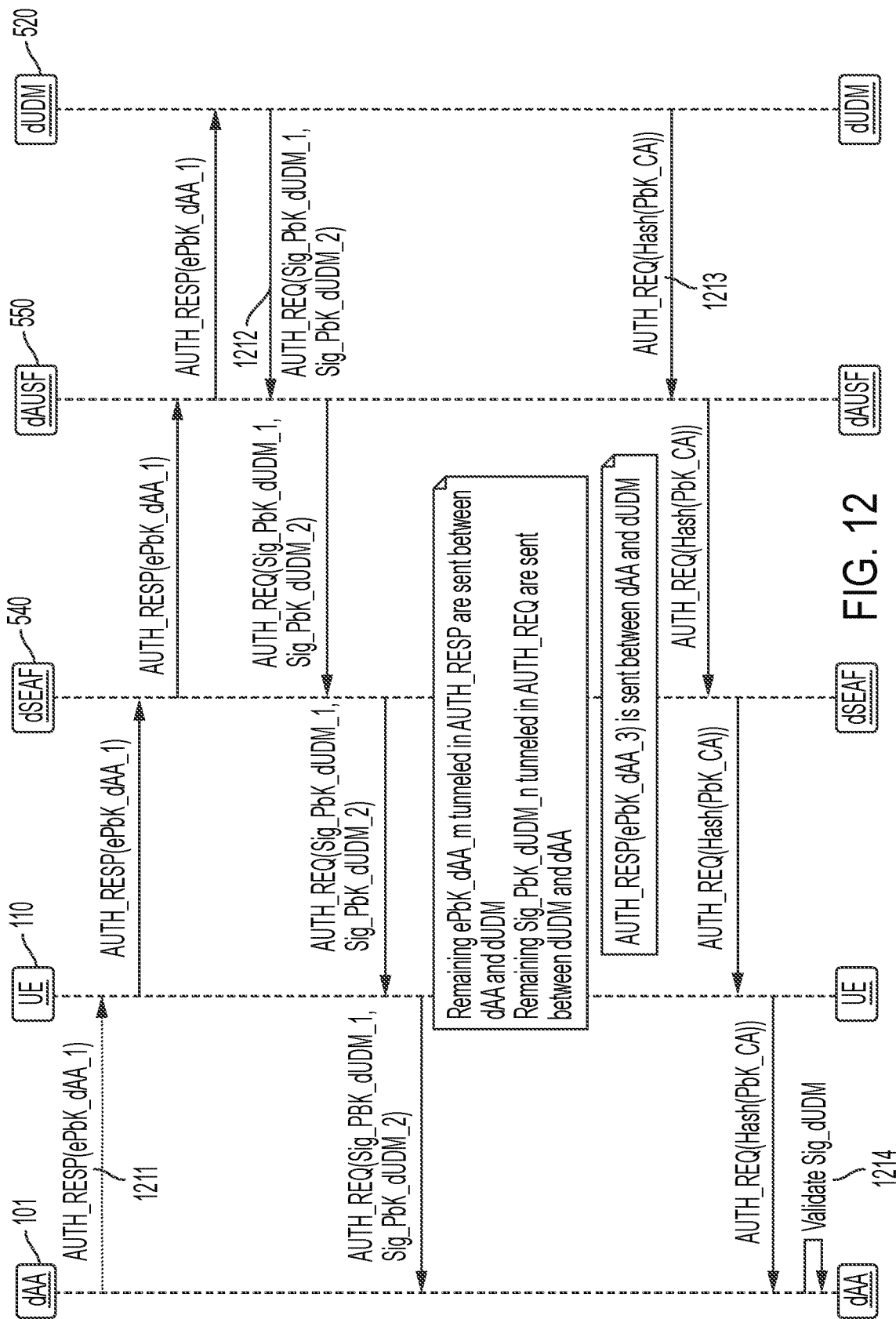
FIG. 12 illustrates an ephemeral key and signature mechanism, in accordance with some embodiments of the present disclosure.

FIG. 12 illustrates an ephemeral key and signature mechanism, in accordance with some embodiments of the present disclosure. A description of elements of FIG. 12 that have been previously described will be omitted for brevity. As illustrated in FIG. 12, since the dAA 101 may not be able to transmit the PbK_dAA directly because the mobile radio interface layer is not (yet) secured, a separate ephemeral EC keypair may be used to derive a common secret key dKI using ECDH between the dUDM 520 and the dAA 101. The dAA 101 creates an ephemeral EC keypair consisting of the ephemeral public key ePbK_dAA and the ephemeral private key ePrK_dAA. The ePbK_dAA is transmitted as a compressed EC point in three (3) authentication response AUTS messages 1211. The dAA 101 is not able so far to reliably validate the Sig_dUDM since the received PbK_dUDM is not yet attested by a trusted CA. The dUDM 520 sends 1212 a signature Sig_PbK_dUDM of the PbK_dUDM. The Sig_PbK_dUDM was created by a trusted Certificate Authority (CA) after the PbK_dUDM had been generated. The Sig_PbK_dUDM is tunneled in two (2) authentication request messages using both RAND and AUTN parameters, though all of these authentication responses are not illustrated in FIG. 12. In addition, the dUDM sends 1213 the SHA-256 hash of the public key of the CA (PbK_CA). This hash is used by the dAA 101 to look up the CA in the dAA's file system. The dAA 101 validates 1214 the received PbK_dUDM against the received dSig_PbK_dUDM against a list of trusted CAs. These CAs are stored in the dAA's file system. This file can be updated over-the-air using Remote File Management (RFM) commands by the home network operator. The CA used for the validation is identified by the SHA-256 hash of its PbK_CA. If a matching CA cannot be found in the dAA 101, the authentication is aborted. After the PbK_dUDM is validated, the dAA 101 checks the provided RAND_dAA against the received Sig_dUDM. If the validation fails, the authentication is immediately aborted.

Figure 13:
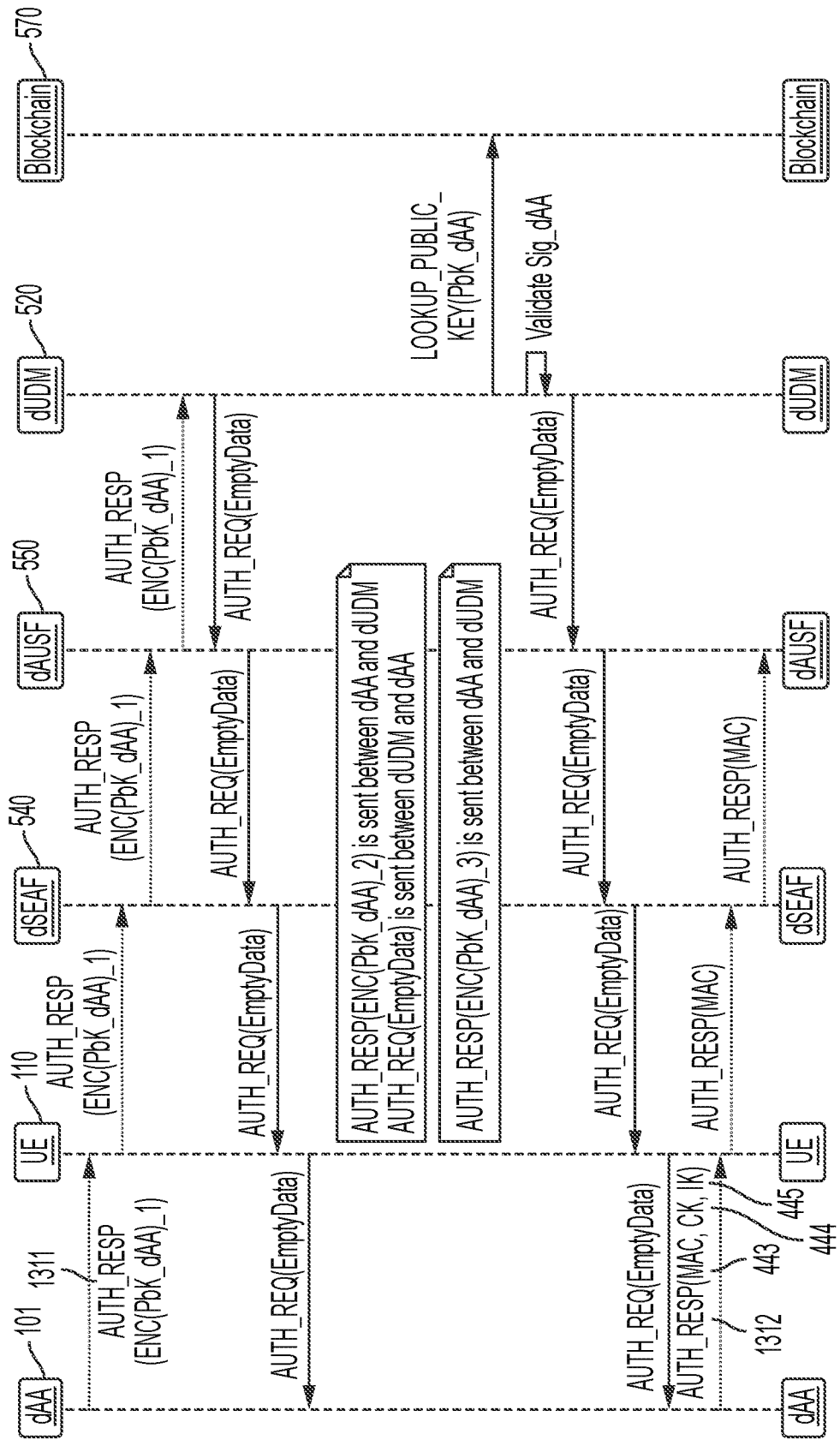
FIG. 13 illustrates an authentication between dAA and dUDM, in accordance with some embodiments of the present disclosure.

FIG. 13 illustrates an authentication between dAA 101 and dUDM 520, in accordance with some embodiments of the present disclosure. A description of elements of FIG. 13 that have been previously described will be omitted for brevity. As illustrated in FIG. 13, the dUDM's dARPF can check the Sig_dAA by using the PbK_dAA. The dAA 101 may encode the PbK_dAA as EC compressed point and encrypting it with dKI using AES-CCM with an 8 byte MAC as ENC(PbK_dAA). The ENC(PbK_dAA) may be transmitted in 3 authentication response AUTS messages 1311, though not all of the authentication response messages are illustrated in FIG. 13. Since the dUDM 101 has no messages to send, it transmits empty authentication requests (i.e., containing zeroes). Since the ePbK_dAA has been transmitted in the previous sequence the dARPF can now also compute the dKi using PrK_dUDM and the ePbK_dAA after having received ENC(PbK_dAA). The dKI is used to decrypt ENC(PbK_dAA) to get the PbK_dAA. The PbK_dAA is looked up on the blockchain 570. If available, additional data related to the issuing home network (including its associated smart contracts) can also be retrieved. dKi is used by the dARPF to derive the MAC 443, CK 444, and IK 445 which are applied in the same way as in the 5G security architecture to compute an anchor key K_AUSF, which in turn is used to derive a key K_SEAF which is processed by the SEAF and the UE 110 to derive session keys for protecting exchanged data integrity and confidentiality purposes. Since the dUDM 520 has no messages to send, it transmits empty authentication requests to the dAA 101. The dAA 101 also derives MAC 443, CK 444, and IK 445 by using ECDH in the same way as the dARPF using PbK_dUDM and PrK_dAA. The MAC 443 is transmitted 1312 in a standard authentication response parameter identical to the 5G security architecture. The dAUSF 550 checks if the MAC 443 computed by the dAA 101 and the dARPF are identical. After all these sequences, a dSIM and a dSIM-aware network have been mutually authenticated and can communicate securely using standard UE and RANs.

Figure 14A:
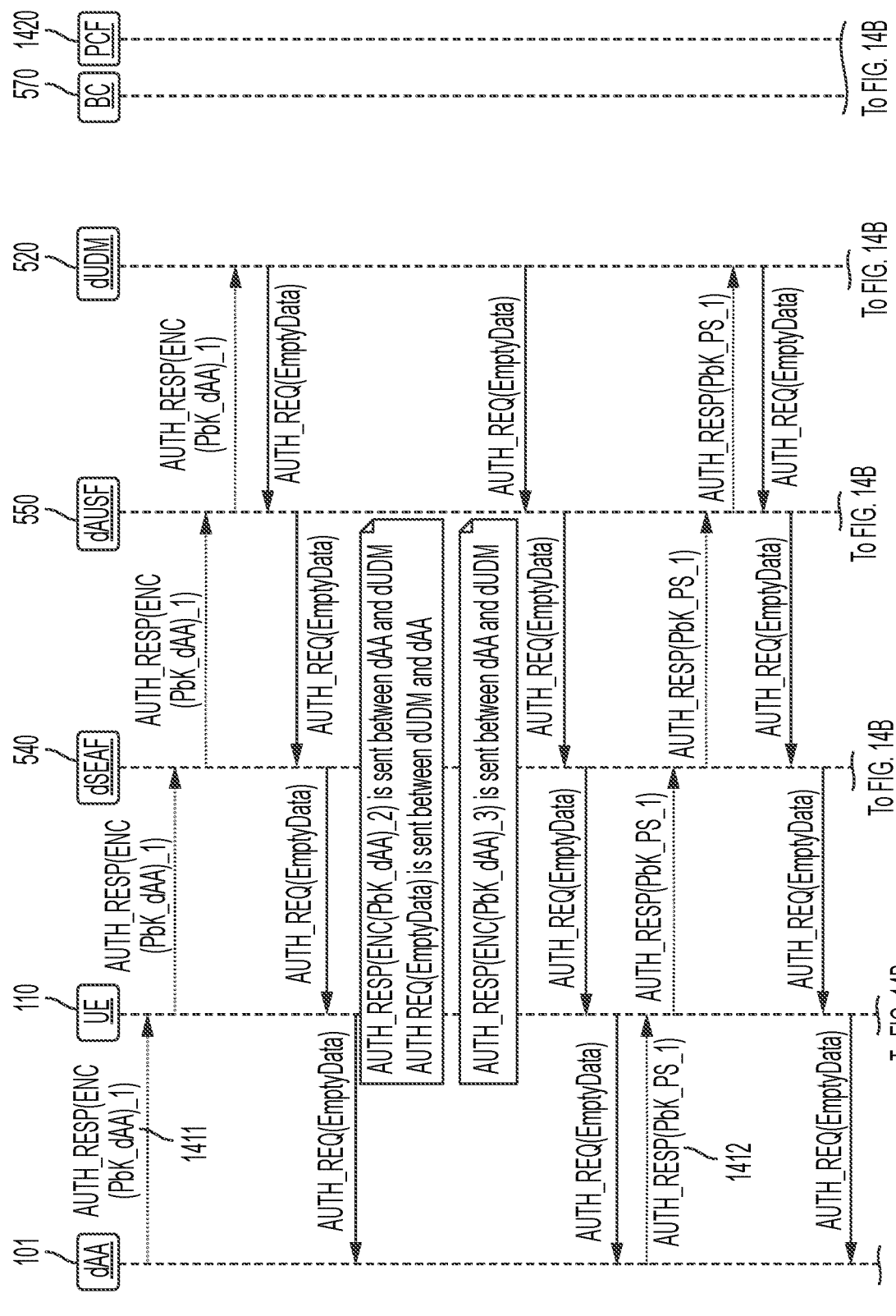
FIGS. 14A and 14B illustrate additional details of a secure initialization process, in accordance with some embodiments of the present disclosure.
Figure 14B:
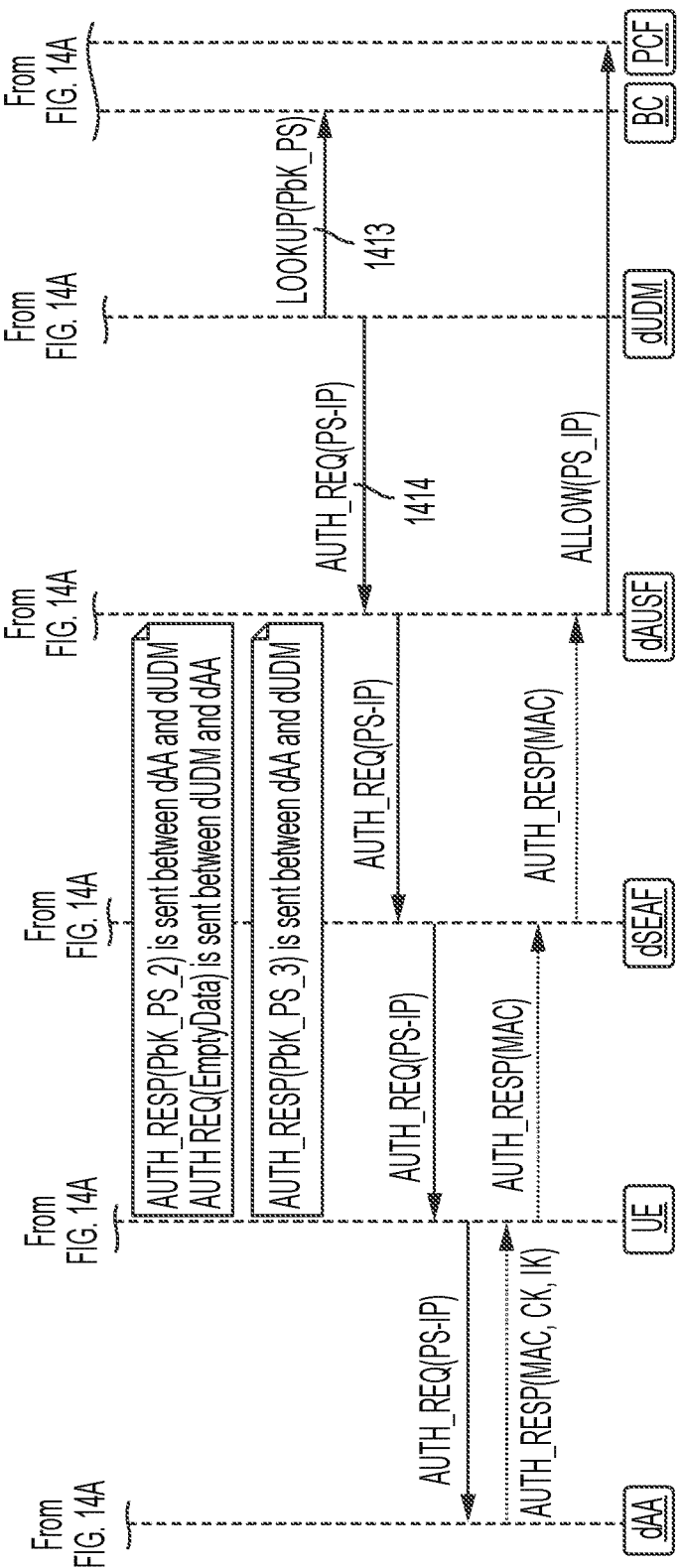

FIGS. 14A and 14B illustrate additional details of a secure initialization process, in accordance with some embodiments of the present disclosure. A description of elements of FIGS. 14A and 14B that have been previously described will be omitted for brevity. As illustrated in FIG. 14A, the secure initialization of the personalization is initiated after the dAA 101 generated the EC keypair. This keypair has not been yet published on the blockchain 570 and the dUDM 520 cannot validate the Sig_dAA. A personalization procedure is first executed by a PS to register the PbK_dAA, create the Cert_dAA and publish both to the blockchain 570. The idea is similar to the initialization process for 6G. In other words, the network authentication shall succeed and allow a restricted (bootstrap) connectivity to the PS. The encrypted PbK_dAA is sent 1411 to the dUDM 520 but the last authentication response message contains a flag in an unused byte indicating the personalization mode. After decrypting the PbK_dAA the dUDM 520 detects the set flag and switches to the personalization mode expecting the PbK_PS from the dAA 101. The dUDM 520 also only validates the Sig_dAA against the PbK_dAA as the Cert_dAA does not yet exist. The dAA 101 sends 1412 the PbK_PS to the PS. As illustrated in FIG. 14B, the dUDM 520 looks up 1413 the PS's IP address from the blockchain 570. The PS's IP address is returned to the dAA 101 using a single authentication request message 1414. After receiving the MAC from the dAA 101, the dAUSF 550 informs the policy control function (PCF) 1420 to restrict the connectivity to the PS's IP address. The personalization protocol for 4G/LTE and 5G is the same or similar to the one previously proposed in 6G systems in this disclosure.

The decentralized network architecture combined with the asymmetric approach should not require a new over-the-air (OTA) mechanism such as remote update to dSIM's filesystem using Remote File Management (RFM) commands by the home network operator. Similarly, the architecture and approach should not require new signal routing mechanism in the context of MSISDN for IMS (i.e., voice services) and SMS (e.g., text services). This is due to the home network that issues the dSIM still has knowledge of the routing to the UE 110 and can therefore remotely connect to it if required.

A globally distributed, decentralized ledger to lookup the routing of a MSISDN may be helpful, but not required to enable critical requirements. Said ledger (i.e., blockchain) would maintain the list of dSIM issuers (i.e., Operators) and their range of MSISDNs. Although the blockchain access is restricted to authorized entities (i.e., private/permissioned blockchain), the location of the subscriber must not ideally be revealed unless required by law enforcement agencies.

The blockchain 570 may be utilized to allow MSISDNs to be linked with their public addresses. Similar to existing blockchains, this should allow subscribers to find each other using their phone numbers instead of hexadecimal addresses. The blockchain 570 can help preserve privacy of phone numbers and addresses. The dSIM's linked MSISDN may be connected with the issuing Operator's legacy back-end with a public switched telephone network (PSTN) or VoIP system. It is noted that PSTN is being phased out as the telecommunications industry migrates to an all-IP network simplifying overall network management. For inbound and outbound roaming, a Discovery Service can be utilized to contain all available service addresses to connect to. The address of the Discovery Service may be retrieved from the issuing Operator's certificate published on the blockchain 570. A hash of each MSISDN may be stored on the blockchain 570 and linked to subscriber's dSIM public key which is also linked to the dAA's public key. After asymmetric authentication with a given AGW is successfully completed, the UE 110 may generate an authentication token AUTH_dAA which is then used to access connectivity services. A session token SESS_dAA may also generated and stored on the blockchain 570.

Since a conventional NAA consists of USIM or ISIM applications, the dAA 101 replaces these applications by reusing the same specific parts of the application identifiers (AIDs) so that the UE's modem explicitly selects the dAA 101 during the initialization procedure. The dAA 101 may support all functions of the USIM and ISIM. This approach may be limited if the dAA 101 is not natively integrated inside the UICC/eUICC/iUICC as certain functions necessary for the USIM/SIM Application Toolkit (USAT) and the Card Application Toolkit (CAT) and their internal Java Card APIs may not be reimplemented as a standalone applet. The basic alternative approach is to consecutively run both dAA 101 and NAA after each other to make applications (e.g., PCA, QSA) using the USAT/CAT functions still work.

Figure 15:
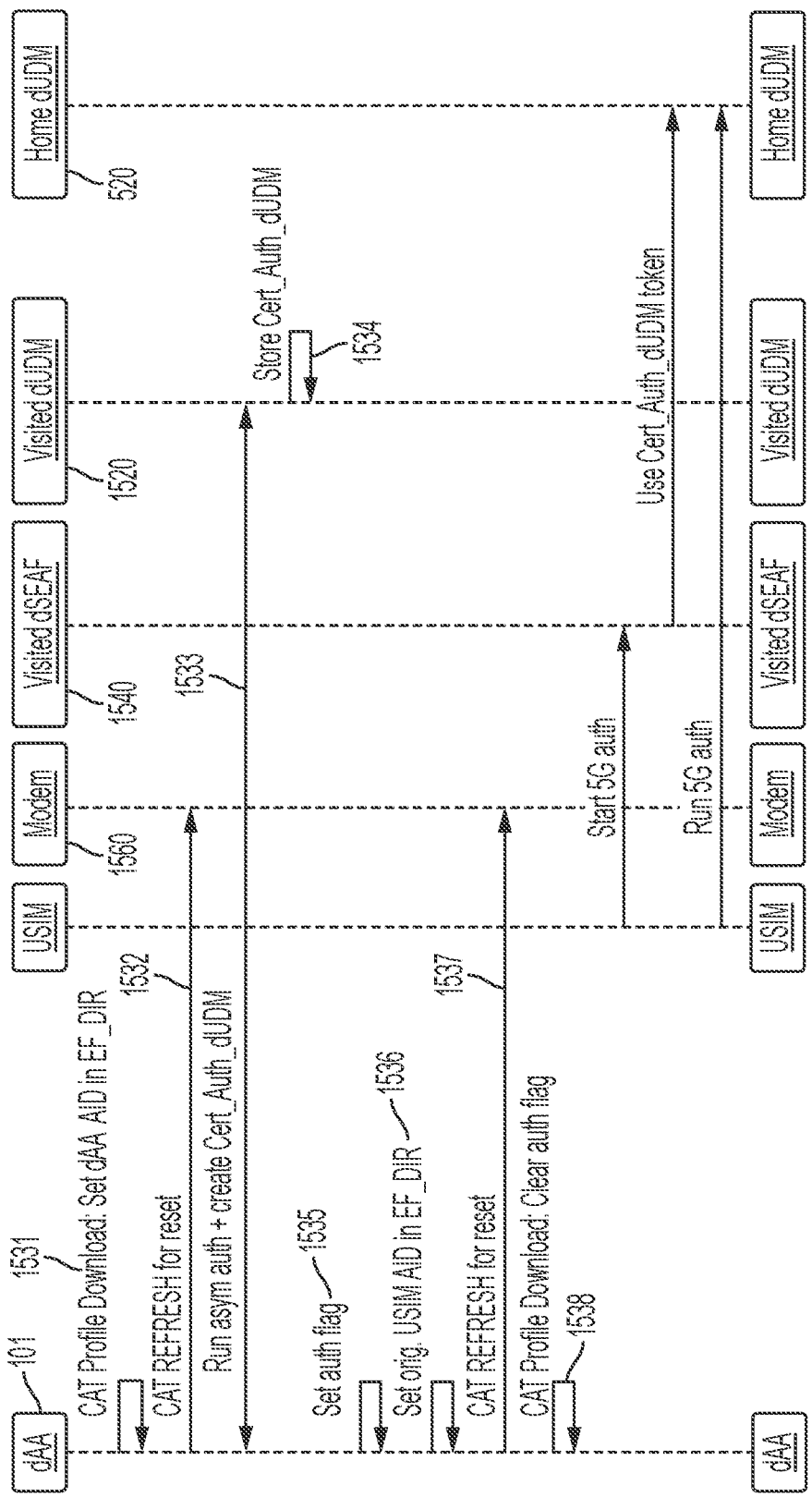
FIG. 15 illustrates an alternative mode to support 4G/LTE and 5G systems, in accordance with some embodiments of the present disclosure.

FIG. 15 illustrates an alternative mode to support 4G/LTE and 5G systems, in accordance with some embodiments of the present disclosure. A description of elements of FIG. 15 that have been previously described will be omitted for brevity. As illustrated in FIG. 15, the dAA 101 is installed and listens to the Profile Download event of the CAT 1531. This event is reported early during the initialization of the UICC. The dAA 101 checks if an authentication is ongoing using an authentication flag and if not overwrites the USIM/ISIM AID with the dAA AID. The dAA 101 triggers a CAT REFRESH 1532 for reset command which instructs the modem 1560 to reset the UICC. The UICC initialization is re-executed by the modem 1560. The dAA 101 is now selected by the modem 1560 as the USIM/ISIM application and runs 1533 the EAP-dAKA against the dUDM 1520 in the visited network. The dUDM may store 1534 the created Cert_Auth_dUDM in the UE's session for connecting later to the home network. The dAA 101 sets 1535 the authentication flag, restores 1536 the original AID of the NAA (e.g., USIM, ISIM) and instructs the modem 1560 to reset the UICC with a CAT REFRESH command 1537. After receiving again the Profile Download event 1538, the dAA 101 checks the authentication flag, clears it, and may not interfere further with the UICC initialization.

The original standard NAA (e.g., USIM, ISIM) is now selected by the modem 1560. The NAA receives an authentication request from the dSEAF 1540. If the visited network is identical to the home network a standard symmetric authentication will be executed. If the home network is different the dSEAF 1540 can communicate with the home network using the authentication token Cert_Auth_dUDM. The dUDM 520 in the home network will be used for executing the standard authentication. In the latter case the first EAP-dAKA was executed to retrieve an access token for the home network.

Figure 16:
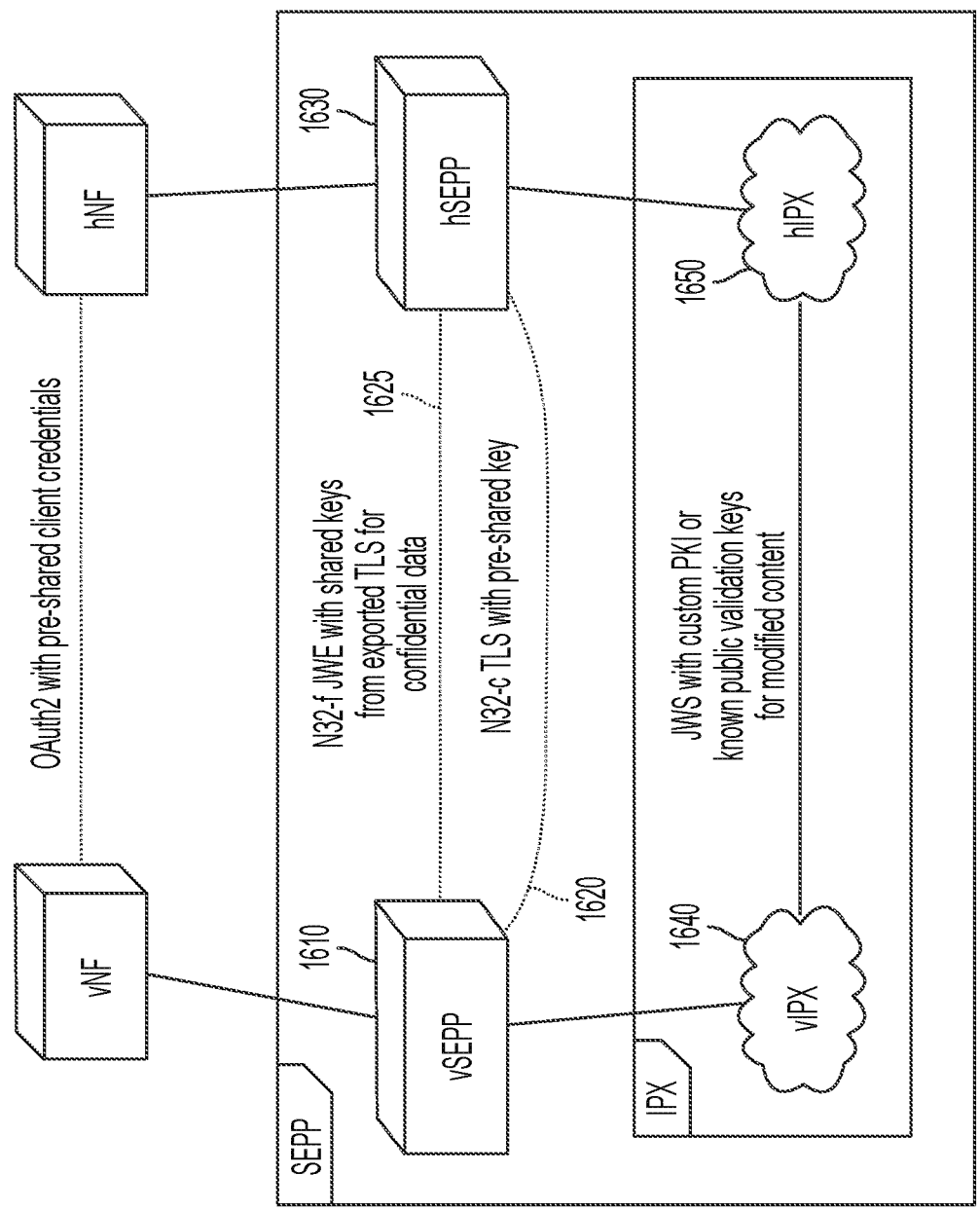
FIG. 16 illustrates a 5G roaming architecture based on the N32 interface, in accordance with some embodiments of the present disclosure.

FIG. 16 illustrates a 5G roaming architecture based on the N32 interface, in accordance with some embodiments of the present disclosure A description of elements of FIG. 16 that have been previously described will be omitted for brevity. As illustrated FIG. 16, the N32 interface is used for the internetwork interconnect between MNO (i.e., the message exchange between network functions (NF) in different 5G network cores to allow roaming. Examples of NFs called in the home network from the visited network are:

AUSF to provide an authentication vectors,
UDM for SMS subscriber information,
User Plane Function (UPF) & Session Management Function (SMF) for data services,
Network Slice Selection Function (NSSF) for network slicing,
IMS Voice Roaming for voice calls.

All NF calls between two different network cores are sent between the Secure Edge Protection Proxies (SEPP) of the networks. The SEPP of the visited network (vSEPP) 1610 creates a TLS connection N32-c 1620 to the home network's SEPP (hSEPP) 1630. TLS uses pre-shared keys between the visited and home network. The TLS computes a session master key to secure the communication between the SEPPs 1610, 1630. The N32-c connection 1620 is kept open between the visited network and home network. The master key from the N32-c connection 1620 is exported and used by the SEPP to derive session keys for the N32-f connections 1625. The N32-f 1625 uses JSON Web Encryption (JWE) to encrypt confidential information and adds integrity protection to the exchanged message by using the AES-CGM algorithm.

In case an IP Exchange (IPX) is used the IPX can modify unencrypted information based on a common policy between the visited and home network. The modification must be signed with a JSON Web Signature (JWS) with the algorithm ES256 using an EC private key owned by the IPX. If a NF in the visited network (vNF) needs to send a message to a NF in the home network, it connects first to the vSEPP 1610. The vSEPP 1610 formats the messages and uses JWE to encrypt and integrity protect it. The vSEPP 1610 may send the message to the visited IPX (vIPX) 1640 which modifies the message and signs it with JWS. The vIPX 1640 sends the message to the home IPX (hIPX) 1650 which can also add modifications and signs the message with JWS. The hIPX 1650 sends the message to the hSEPP 1630 which checks the modification from the hIPX 1650 and vIPX 1640 and decrypts the information, validates the integrity, and reformats the message to match the NF format. The hSEPP 1630 sends the message to the home NF (hNF).

Independent of whether the NF connects within a network core or to a different network core, it may use OAuth 2.0 with the client credentials grant type for the authentication and authorization to a different NF. The NF uses the Network Repository Function (NRF) as the authorization server to retrieve an access token. The access token is a JSON Web Token using JWS. The NF uses this access token with the other NF acting as resource server to authorize and get access to the requested resources.

The problems arising from the existing 5G internetwork interconnect security include the inflexible manual assignments of pre-shared keys, public keys, and client credentials. A global decentralized system may not be supported in which MNOs can freely roam between different networks. A new 6G roaming architecture is therefore proposed.

Figure 17A:
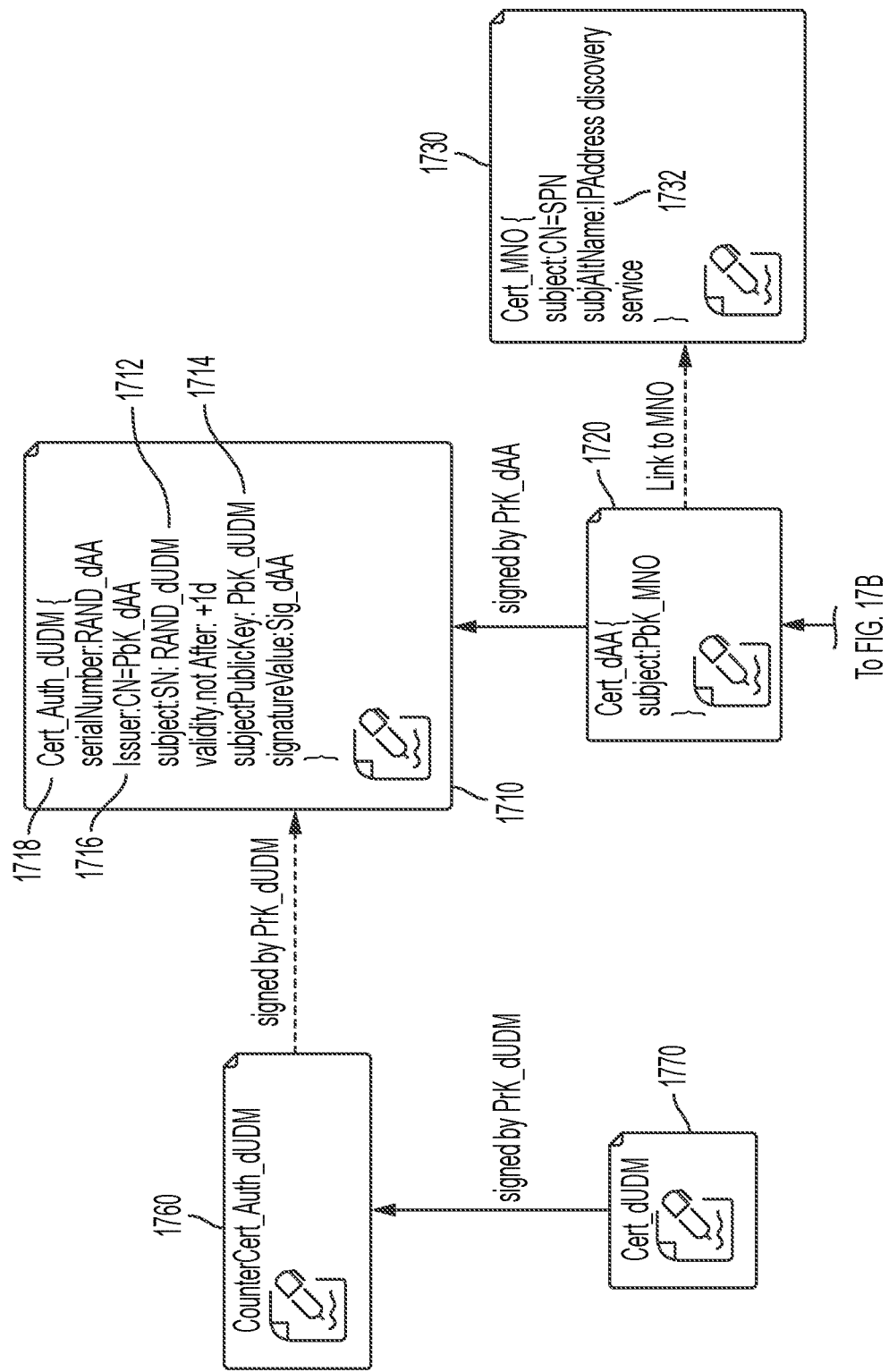
FIGS. 17A and 17B illustrate a dUDM Authentication Certificate for roaming support, in accordance with some embodiments of the present disclosure.
Figure 17B:
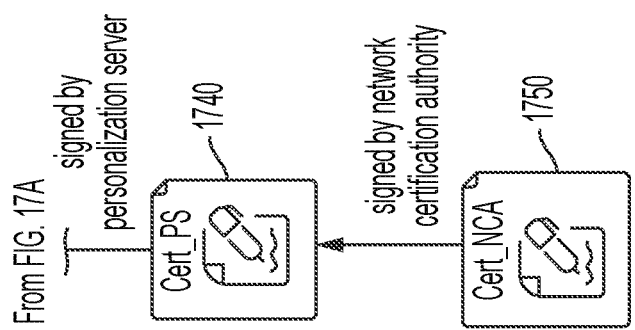
Figure 18:
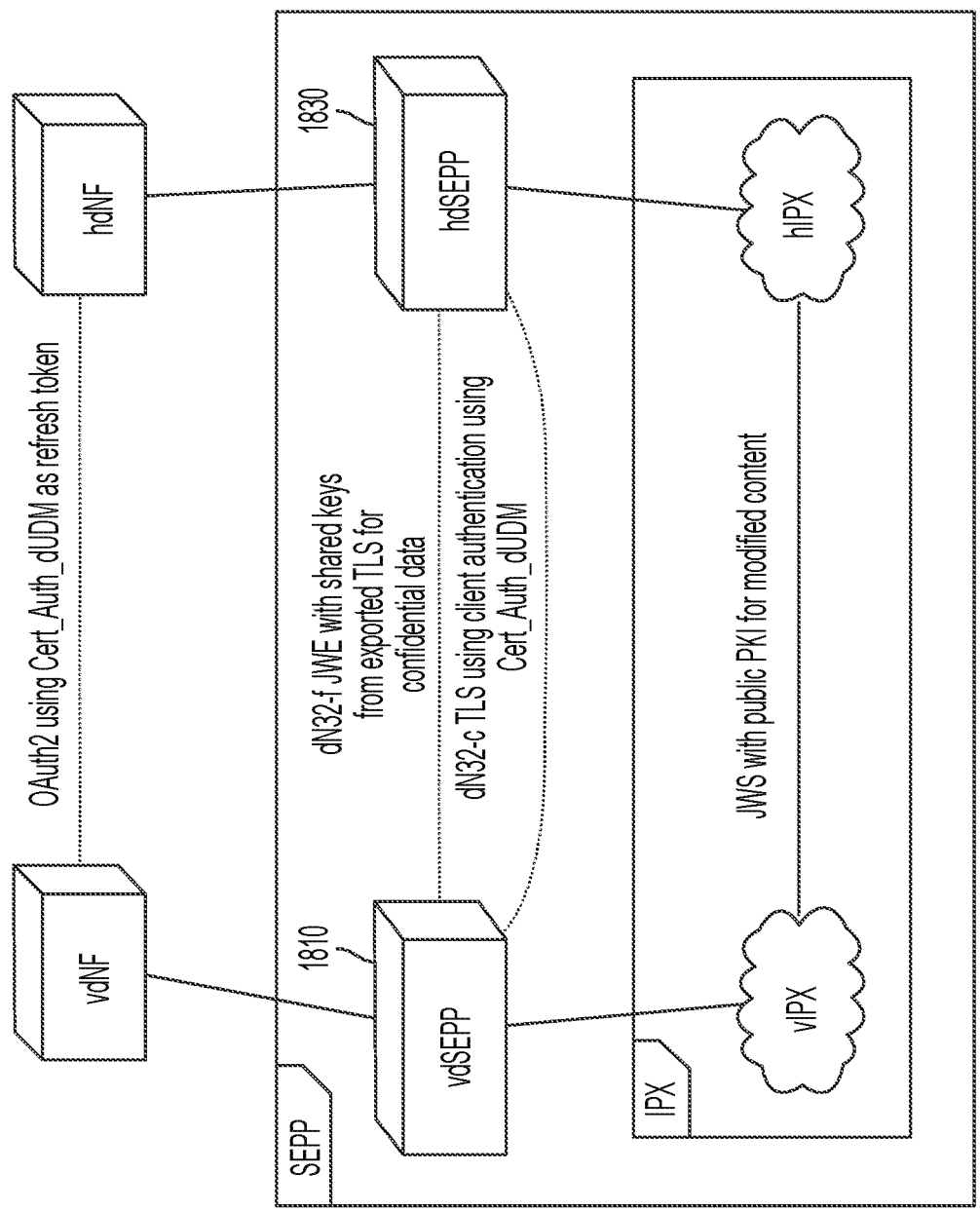
FIG. 18 illustrates a proposed 6G roaming architecture based on the N32 interface, in accordance with some embodiments of the present disclosure.

FIGS. 17A and 17B illustrate a dUDM Authentication Certificate for roaming support, in accordance with some embodiments of the present disclosure. FIG. 18 illustrates a proposed 6G roaming architecture based on the N32 interface, in accordance with some embodiments of the present disclosure. A description of elements of FIGS. 17A, 17B, and 18 that have been previously described will be omitted for brevity. As illustrated in FIGS. 17A and 17B with a data structure signed by Sig_dAA and further illustrated by FIG. 18, this architecture uses authentication tokens derived from the decentralized dSIM authentication as trust anchor.

The data signed by the dAA 101 is a certificate Cert_Auth_dUDM 1710 which is not only used for the authentication between the dAA 101 and the dUDM 520, but is also an authentication token which can be used for the authentication against the decentralized SEPP of the home network (hdSEPP) 1630 from the visited network's decentralized SEPP (vdSEPP) 1610. The Cert_Auth_dUDM 1710 includes the challenge RAND_dUDM 1712 as subject provided by the dUDM 520, but also other commonly known data between the dAA 101 and the dUDM 520. The public key attested by the Cert_Auth_dUDM 1710 is the public key PbK_dUDM 1714 from the dUDM 520. This link assures that the dAA 101 has authenticated against the implied dUDM 520 and knows its identity. The identity of the dAA 101 is included in the issuer field using PbK_dAA 1716 which can be used as a lookup key in the blockchain. The authentication token may expire within one day, if the session between the dAA 101 and the dUDM 520 lasts longer, the visited network may request a new authentication from the dAA 101. As serial number the RAND_dAA 1718 is used since a random 128 bit value will assert a unique number required by the X.509 RFC. The certificate is signed by the private key PrK_dAA proving that the certificate was issued by the dAA 101.

To establish the decentralized N32-c (dN32-c) connection, the vdSEPP 1810 fetches the Cert_dAA 1720 from the blockchain 570 and uses the link in the certificates subject to the public key of the MNO (PbK_MNO) to look up the certificate of the MNO. The MNO has created the Cert_MNO 1730 during the decentralized network setup. The Cert_MNO 1730 contains an IP address of a discovery service (DS_MNO) 1732 provided by the MNO. The DS_MNO contains the address and configuration of the SEPP. The vdSEPP 1810 connects to the hdSEPP 1830. Instead of creating a TLS connection using pre-shared keys the Cert_Auth_dUDM is used as a client certificate as part of a certificate chain. The Cert_dAA 1720 referenced in the issuer field of Cert_Auth_dUDM 1710 may be also included in the certificate chain together with the certificate of the personalization server Cert_PS 1740. TLS checks the certificate chain Cert_Auth_dUDM 1710, Cert_dAA 1720, Cert_PS 1740 and optionally a well-known network CA certificate Cert_NCA 1750, if the Cert_PS 1740 is not a trusted or root CA. After the TLS handshake is completed, the hdSEPP 1830 may check that the dAA 101 was issued for the home network's MNO. In addition, to prevent that a dAA 101 can connect to the hdSEPP 1830 without being connected to a dUDM 520 also the counter signature CounterCert_Auth_dUDM 1760 may be provided and is checked against Cert_dUDM 1770. Cert_dUDM 1770 can be looked up using the signed PbK_dUDM 1714 in the Cert_Auth_dUDM 1710.

It is noted that the setup of the N32-f interface and its usage may not change in comparison to the existing 5G architecture.

The address of the IPX may be stored in the DS_MNO. The IPX interfaces may use public keys which are also published in the DS_MNO to enable global accessibility. Since the usage of IPX is optional it can also be considered to rely solely on classical ISPs. The lack of necessary levels of QoS having motivated the GSMA to introduce a dedicated interconnect between MNOs may not be the case for many services. As described herein, Local Breakout is a roaming model which does not tunnel the data traffic back to the home network.

Instead of using client credentials between the NFs, decentralized NFs (dNF) may also support the OAuth 2.0 Refresh Token Grant type. The Cert_Auth_dUDM 1710 with its certificate chain and the CounterCert_Auth_dUDM 1760 are used as a refresh token to retrieve an access token from the decentralized NRF (dNRF). The dNRF checks the refresh token in a similar way as the validation carried out for the TLS-c connection.

It is worth noting that the internetwork interconnect security architecture for 4G/LTE is different, but the core idea of applying a PKI to the authentication still holds.

The existing 5G roaming architecture defines two different modes for how a home network is integrated into a visited network: Home Routed (HR) and Local Breakout (LBO). LBO allows the subscriber of a visited network to directly receive data services from the visited network instead of tunneling the data back to the home network. The data traffic does not need to pass through the visited and home network (which offers reduces latency).

Furthermore, it does not require calling the UPF and SMF NF in the home network. For a decentralized network LBO may be utilized as the roaming architecture. A disadvantage of LBO is that the data traffic cannot be monitored by the home network which can lead to disputes over the consumed data. Moreover, spending limits may not be taken into account since in LBO the Policy Control Function (PCF) and Charging Function (CHF) are not used from the home network, To address the spending limits, a decentralized Billing Function (dBF) responsible for negotiating the rates between the visited network and home network may be utilized. The visited network's dBF (vdBF) may call the home network's dBF (hdBF) to create an offer for the provided roaming services. In agreement with Charging Functions (CHF) requirements of 5G, the rates would depend on the location of the UE, the service type, the time of day and other criteria. The home network may call the vdBF to set the allowed quota while taking into account the received offer. The home network may update the quota anytime (e.g., home network sends a SMS to the subscriber to inform about the pricing for roaming and after getting an agreement to increase the quota). When the roaming session ends, the visited networks send an invoice to the hdBF. This mechanism may suit well an international roaming scenario, or at least a non-permanent roaming scenario (e.g., smartphone) whereby handover may not be as important as a mission critical IoT application (e.g., delivery drone, self-driving car). In the latter case (i.e., mission-critical IoT application), roaming/offloading contracts should be in place (i.e., pre-negotiated) prior to the devices being deployed in the field.

It is envisaged that the subscriber's UE (e.g., delivery drone) could roam across various AGWs from different decentralized networks in a short period of time. This may include synchronizing different AGWs (i.e., network cores) using a shared session token which was originally created upon the first authentication session. The shared session token may be stored into the orchestrating blockchain via a specialized service linked to all Session Management Functions (SMFs) in the context of 5G. For 4G/LTE, a similar mechanism may be utilized, but instead of SMFs being coordinated, the offloading gateway interconnects visited network's MME (via DEA) to home network's HSS (via DRA) over an enhanced S6a interface (S6a+). In case LBO is not supported, data traffic is routed from home network's SGW (via GTP) to home network's PGW over a typical S8 interface.

The advent of quantum computers (e.g., using Grover's or Shor's algorithms) represents a threat to symmetric and asymmetric cryptography. It is appreciated that many blockchain-based systems may undergo major redesigns to prevent quantum attacks. It is therefore important to provide measures to reduce and/or prevent this potential security threat. While quantum computer's algorithms may speed up attacks against symmetric ciphers, it has been suggested that doubling the key size can effectively block these attacks. Thus, post-quantum symmetric cryptography may not need to differ significantly from current symmetric cryptography.

The 3GPP standard is inherently secure against attacks by a quantum computer provided minor changes are made. Indeed, symmetric key cryptographic systems such as AES can be quantum resistant when key sizes are doubled (e.g., using a 256-bit key instead of 128-bit key). Other disclosures, such as U.S. Patent Application Publication 2022/0240095, have proposed a Quantum Resistant SIM Card using a 256-bit key to make a mobile network relatively secure against attacks by quantum computers. Although it appears as minor changes, it may include a replacement of all UICCs and require an update of the network core's 5G UDM (and associated components) or 4G/LTE HSS (and associated components) to use 256-bit keys. This infrastructure upgrade is still relatively complex and must be evaluated by mobile operators attempting to migrate their networks to be quantum resistant. On the other hand, it has been determined that asymmetric cryptography may be more vulnerable to quantum attacks. For the sake of clarity, asymmetric cryptography is presented hereby in the context of both public-key cryptography and hash functions.

In this disclosure, an embodiment of public-key cryptography is an elliptic curve (EC) cryptography keypair using the secp256r1 curve consisting of the dAA's EC private-public keypair (PrK_dAA, PbK_dAA) and the dUDM's (or its equivalent) private-public keypair (PrK_dUDM, PbK_dUDM). Both dAA's and dUDM's public keys are published on the blockchain. The curve secp256r1 is used since it is a standard curve supported by existing (e)UICCs and the Java Card Signature API. Hash functions are also utilized in this disclosure. For instance, the dUDM sends the SHA-256 hash of the public key of the CA (PbK_CA). Theoretically, the herein solution is made quantum-resistant by replacing secp256r1-based elliptic curve cryptography by some form of post-quantum cryptography. This may not be practical in the short term as it would require the deployment of new UICCs. However, many smart chip manufacturers are reportedly targeting to support quantum-resistant algorithms as early as in 2025. A safe migration to quantum-resistant UICCs (eUICCs or iUICCs) is therefore possible since earliest predictions for the quantum threat are after that year. It is therefore implied the decision to replace UICCs (eUICCs or iUICCSS) would need to take into account the clear advantages of asymmetric authentication over symmetric authentication in the context of decentralization. A migration path including processes (e.g., key replacement) towards post-quantum cryptography may be introduced in both cases.

It has been described herein that a dSIM (consisting of at least a dAA instance) may be stored on the blockchain at the beginning of its lifecycle as an NFT or an SFT. The public key (PbK_dAA) is published on a blockchain together with the issuing home network's public key (PbK_dUDM).

There are various ways for deploying and managing the dSIM as an NFT on an existing, off-the-shelf blockchain using a typical proof-of-stake consensus mechanism The typical blockchain would achieve consensus using a proof-of-stake mechanism with high transaction speeds and lower associated processing costs. The typical blockchain may be either permissionless (i.e., publicly accessible) or permissive (i.e., not publicly accessible).

An example of a permissionless public blockchain is Algorand with a possible implementation of the dSIMs, initially published as NFTs based on Algomart, which is an open source, white-label solution for launching an NFT marketplace built on top of the Algorand blockchain. An example of a permissioned blockchain is the GSMA's private blockchain used for the wholesale roaming initiative. The GSMA's private blockchain is essentially built upon IBM's Hyperledger Fabric blockchain solution, which is an enterprise-grade permissioned distributed ledger framework for developing solutions and applications. However, it has been reported that Hyperledger Frabric may be complex as it attempts to support all potential business applications across various verticals and industries. The GSMA's private blockchain may not leverage SIM capabilities in its architecture and may not natively support tokens as a form of cryptocurrencies. Some form of cryptocurrency may be used to effectively deploy a decentralized mobile network as it provides the economic framework to incentivize all key stakeholders. It is worth noting that Solana, Cardano, Ethereum as layer 1 could also be utilized with embodiments of the present disclosure. These existing blockchain systems may be either multi-purpose or non-telecommunications industry specific. More specifically, there may be concerns related to high transaction costs, performance, and reliability issues. Karrier One, a blockchain-telecom project proposed a carrier-grade ledger but may not utilize SIM capabilities in its system. Similarly, XNET, another blockchain-telecom project, does not appear to mention SIM or eSIM in its white paper.

Figure 19:
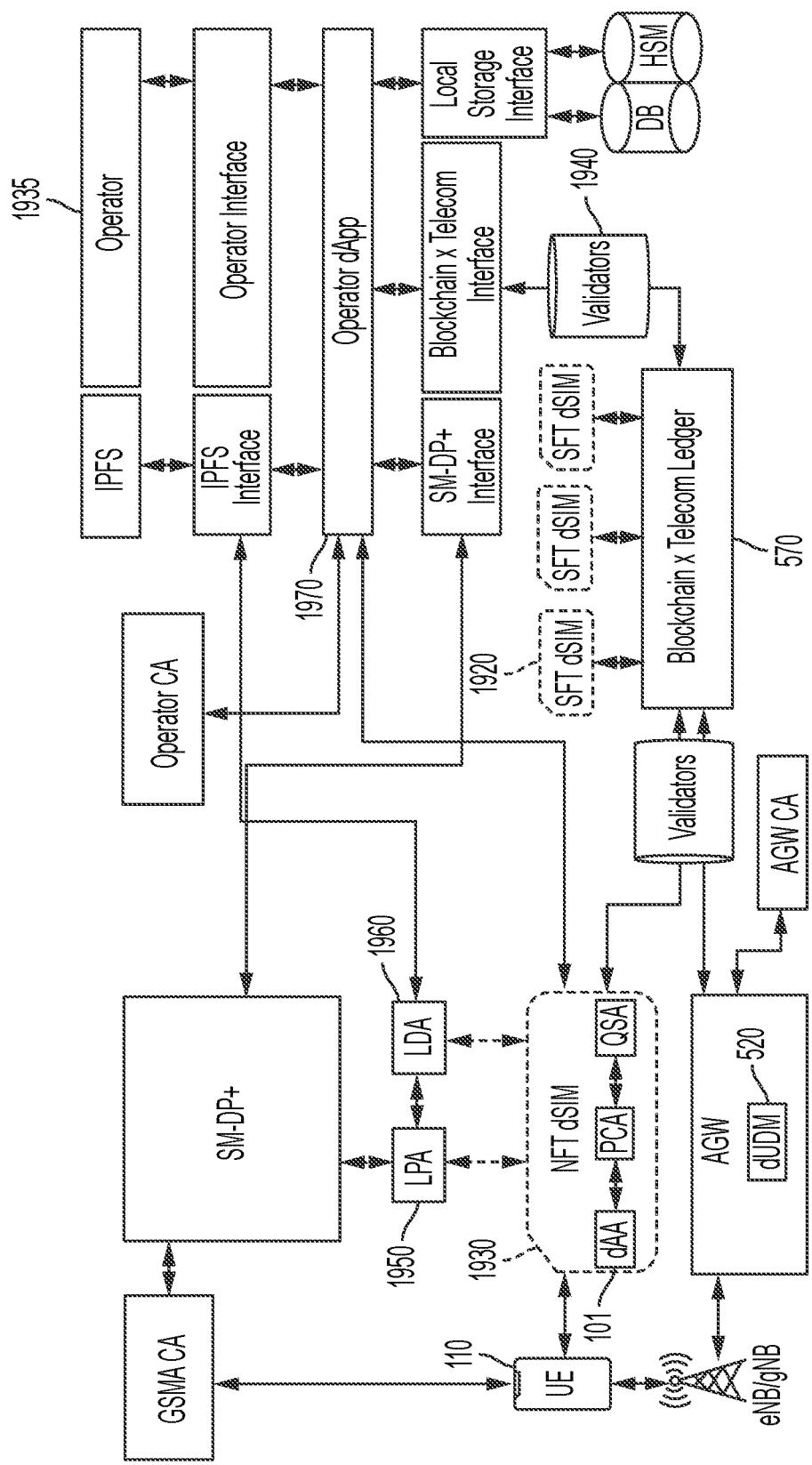
FIG. 19 illustrates a distributed blockchain-telecom ledger architecture with dSIMs, in accordance with some embodiments of the present disclosure.

To address concerns with existing blockchain protocols, it is therefore proposed to implement a carrier-grade blockchain-telecom distributed ledger natively utilizing the decentralized electronic SIM concept. FIG. 19 illustrates a distributed blockchain-telecom ledger architecture with dSIMs, in accordance with some embodiments of the present disclosure. A blockchain-telecom ledger 570 is proposed to mitigate both technical and commercial risks and provide a foundation for newer decentralized mobile networks compatible with dSIM technology. Similar to existing blockchains, the blockchain-telecom ledger 570 according to some embodiments of the present disclosure may deliver decentralization, scalability, security, and transaction finality. A dSIM 1920 is initially deployed as an SFT using a hybrid consensus mechanism on the carrier-grade blockchain-telecom ledger 570 optimized for telecom infrastructure and transactions. The proposed consensus mechanism is similar to an energy-efficient actual proof-of-work (i.e., not based on mathematical puzzles, but mobile network-related activity as further disclosed hereafter) to allow dSIMs to achieve their full potential as decentralized identity tokens for mobile network access.

The custom, lightweight blockchain-telecom ledger 570 would manage the lifecycle of a dSIM published by the Operator 1935 and minted initially as an SFT 1920, installable (via an off-chain SM–DP+) and activatable on a user equipment as an NFT 1930 when the subscriber purchases a prepaid or postpaid mobile plan. In this system, the Operator 1935 is therefore the issuer of the dSIM 1920 on the blockchain.

Once a subscriber purchases the dSIM with an associated mobile plan (prepaid or postpaid) as an SFT 1920 from the web or a mobile app-based marketplace, the dSIM is downloaded and activated as an NFT 1930 (via both LPA 1950 and LDA 1960). Upon completion of the personalization process of the dSIM's dAA 101, the dSIM's public key (i.e., dAA's PbK_dAA) is stored on the blockchain 570. For example, a dSIM 1920 that represents a valid $5 for 5G prepaid plan may have the same value as an identical dSIM 1920 with the same data plan and may therefore be interchangeable. The loss of exchangeable value makes the activated dSIM non-fungible. Each dSIM 1920 is an instance of a smart contract which has a unique tokenURI, containing asset metadata in an optimized file format (e.g., ASN.1, protobuf, JSON file, etc.).

The metadata is where additional dSIM attributes (issuer name/label, logo URL, activation URL, description, etc.) may be stored. A dSIM metadata is stored off-chain in a decentralized InterPlanetary File System (IPFS), which is a protocol and peer-to-peer network for storing and sharing data in a distributed file system. In order to prevent and/or reduce "link rot" which would tamper with off-chain storage of metadata, the IPFS must be amongst trusted peers. It is also envisioned that in some instances, the dSIM may be downloaded as a PKPass on an iPhone's Wallet app. In that mode, a subscriber interacts mainly with the iPhone's Wallet to view and top up their prepaid balance (i.e., prepaid users) and visualize their data consumption. This assumes obviously that the iPhone's Wallet app has natively direct access to the dSIM.

The blockchain-telecom distributed ledger protocol is implemented as a Layer 1 blockchain and telecom ledger (comparable to an application-specific combination of Bitcoin and Ethereum). This protocol utilizes a hybrid proof of work and stake. The various incentivized network participants (with each a functional role and staked amount of tokens) include a dSIM issuer (i.e., MNO), dSIM holder (i.e., subscriber), a decentralized network equipment host managing an access gateway (i.e., AGW) which runs critical network software components (e.g., dUDM 520) at the edge, and a dSIM verifier (i.e., Validator) 1940 that ensures integrity of network transactions including coverage and/or quality. Said protocol is intended to realize a peer-to-peer, decentralized, autonomous and interoperable mobile networks.

LPA 1950 is a Local Profile Assistant per GSMA's standards. LPA 1950 installs an eSIM profile (i.e., a dSIM would appear as an eSIM to it) into the UE 110 which has been pre-provisioned at manufacturing with a GSMA CA's certificate that allows certified RSP/SM-DP+ systems to remotely install an eSIM. LDA 1960 stands for Local Decentralized Assistant and ensures metadata associated with the dSIM (e.g., MNO's logo, associated plan, activation URL, etc.) is properly fetched by the UE 110. An LDA 1960 can be an Operator's mobile app (e.g., mobile app-based marketplace mentioned above). The Operator dApp 1970 is a decentralized web application used by an Operator 1935 (via an Operator interface which could be a portal and/or APIs). The Operator dApp 1970 utilizes smart contracts to manage the lifecycle of the dSIM 1920 including offloading agreements with various decentralized networks. The Operator dApp 1970 may utilize a local storage system consisting of a Local DB and Hardware Security Module (HSM) to manage Operator's specific sensitive information not intended to be published on the blockchain. In another embodiment, the Operator dApp 1970 may also act as the Subscriber dApp providing the web-based marketplace described herein.

The proposed distributed ledger's token may be utilitarian, and its value may be pegged to a fiat currency (e.g., US dollar) as a stablecoin with an unlimited maximum supply as a chain variable. In that model, participants purchasing said stablecoin to perform a telecom-related activity only earn interest (i.e., rewards) without impacting the price of the token. The creators of a block are chosen during a period of time (i.e., defined epoch as a blockchain variable) via an election mechanism using off-chain data retrieved and verified by a group of randomly selected validators 1940. The validators 1940 bridge the blockchain 570 and the telecommunications worlds. A validator 1940 would facilitate the entry of real-world data into the blockchain 570. This information might range from dSIM plan pricing to decentralized network statistics (e.g., signal strength such as RSRP and RSRP). The validator 1940 may be bidirectional, allowing it to also share data with the outside world. The validators 1940 would essentially access control mechanisms for reading, writing, and updating the distributed blockchain-telecom ledger 570.

Figure 20:
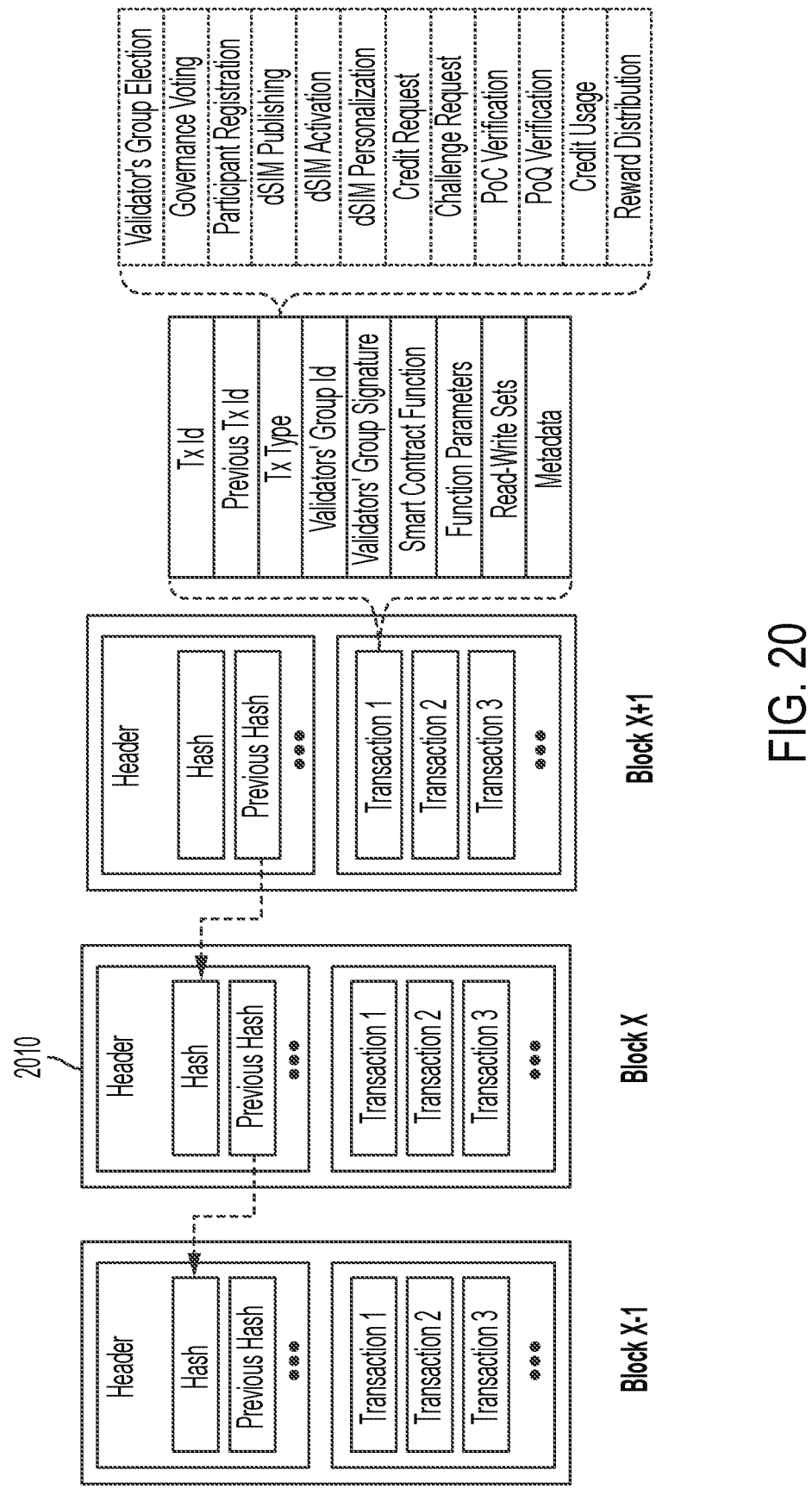
FIG. 20 illustrates a distributed blockchain-telecom ledger data structure, in accordance with some embodiments of the present disclosure.

FIG. 20 illustrates a distributed blockchain-telecom ledger data structure, in accordance with some embodiments of the present disclosure. Each record in the blockchain-telecom distributed ledger 570 is a typical block data structure as illustrated in FIG. 20. A record (i.e., block) 2010 includes a header, current and previous hashes of linked blocks 2010, and a list of transactions. Upon creation of a block 2010, a transaction such as the execution of a smart contract may be performed Distributed ledger-related consensus operations include proofs of network access and coverage/quality. Other operations are related to the lifecycle of a dSIM (e.g., creation, issuance, etc.), its associated mobile plan (creation, purchase, top-up, etc.) and offloading agreements. A Merkle tree (also known as a binary hash tree) is utilized as a data structure to efficiently and securely encode the blockchain-telecom ledger data.

As described herein, the PbK_dAA is looked up on the blockchain 570. If available, additional data related to the issuing home network (including its associated smart contracts) can also be retrieved. It is also noted that the AGW may be a node of the blockchain 570 and therefore has a copy of the ledger 570 locally.

Operators (i.e., Issuers of dSIMs and related mobile plan/smart contracts), Subscribers (i.e., UE's managers/dSIM users), Hosts (i.e., AGWs' managers) perform specific connectivity access work. Registration request is verified by Validators with KYC performed if required. The created block 2010 on the blockchain 570 pertaining to the registration is then created.

Operators issue dSIMs as SFTs with related mobile plans and smart contracts. Operators then market their services to subscribers who possess compatible dSIM-compatible UEs. This work, if validated, would create blocks on the blockchain pertaining to dSIM creation.

Subscribers (consumers or enterprises) owning UEs (e.g., phone, drone, etc.) purchase and download dSIMs as NFTs and use them to access the network via AGWs. This work, if validated, would create blocks on the blockchain pertaining to dSIM activation as NFT, dSIM network usage and dSIM plan top-up if prepaid or periodical payment if postpaid, or coverage/quality proofs.

Hosts manage decentralized network equipment, provide mobile network access to UEs and honor smart contracts from Operators. This work, if validated, would create blocks on the blockchain-telecom ledger pertaining to dSIM network authentication and access via AGWs.

Figure 21:
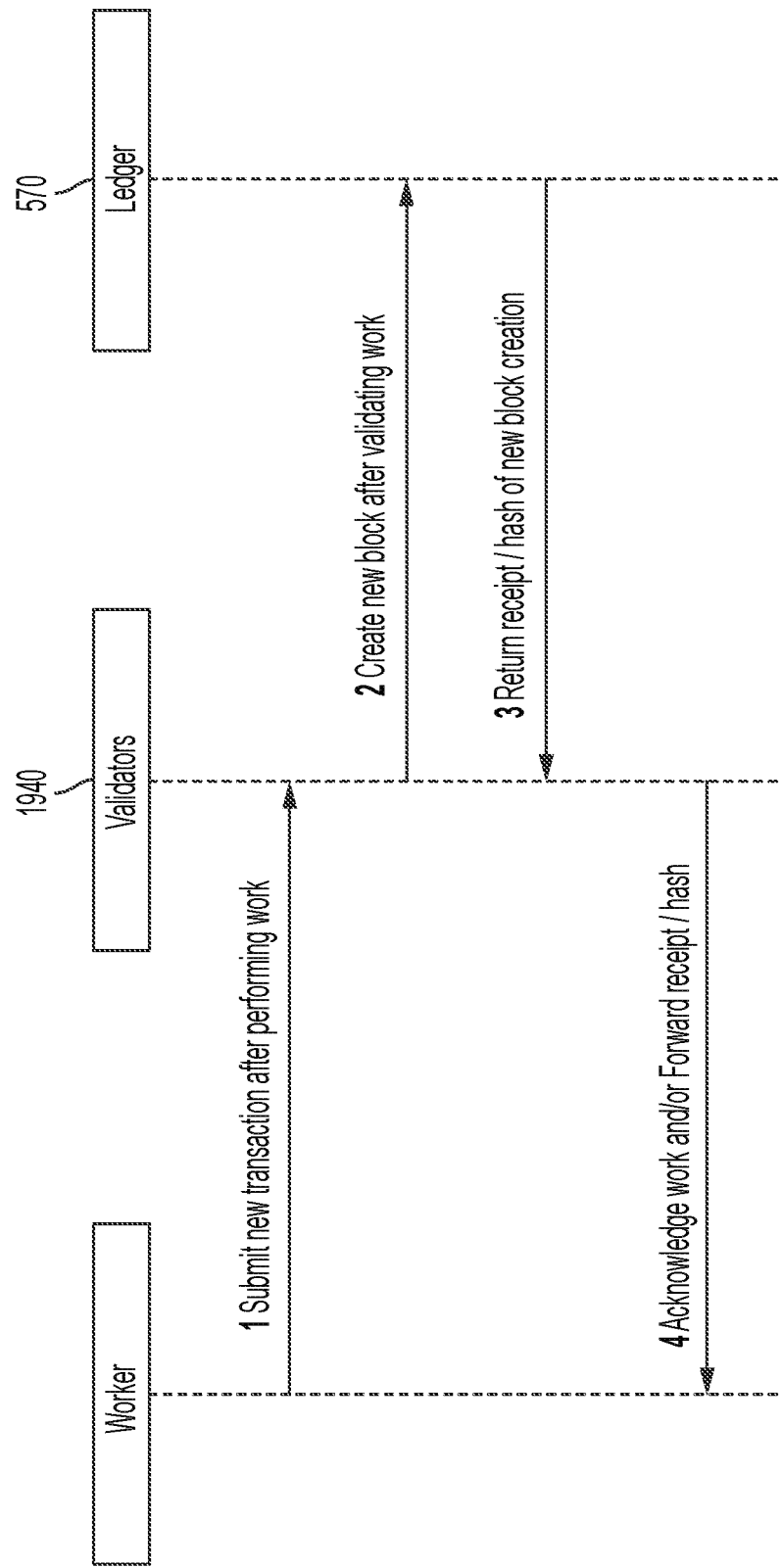
FIG. 21 illustrates a telecom-specific block creation mechanism, in accordance with some embodiments of the present disclosure.
Figure 22:
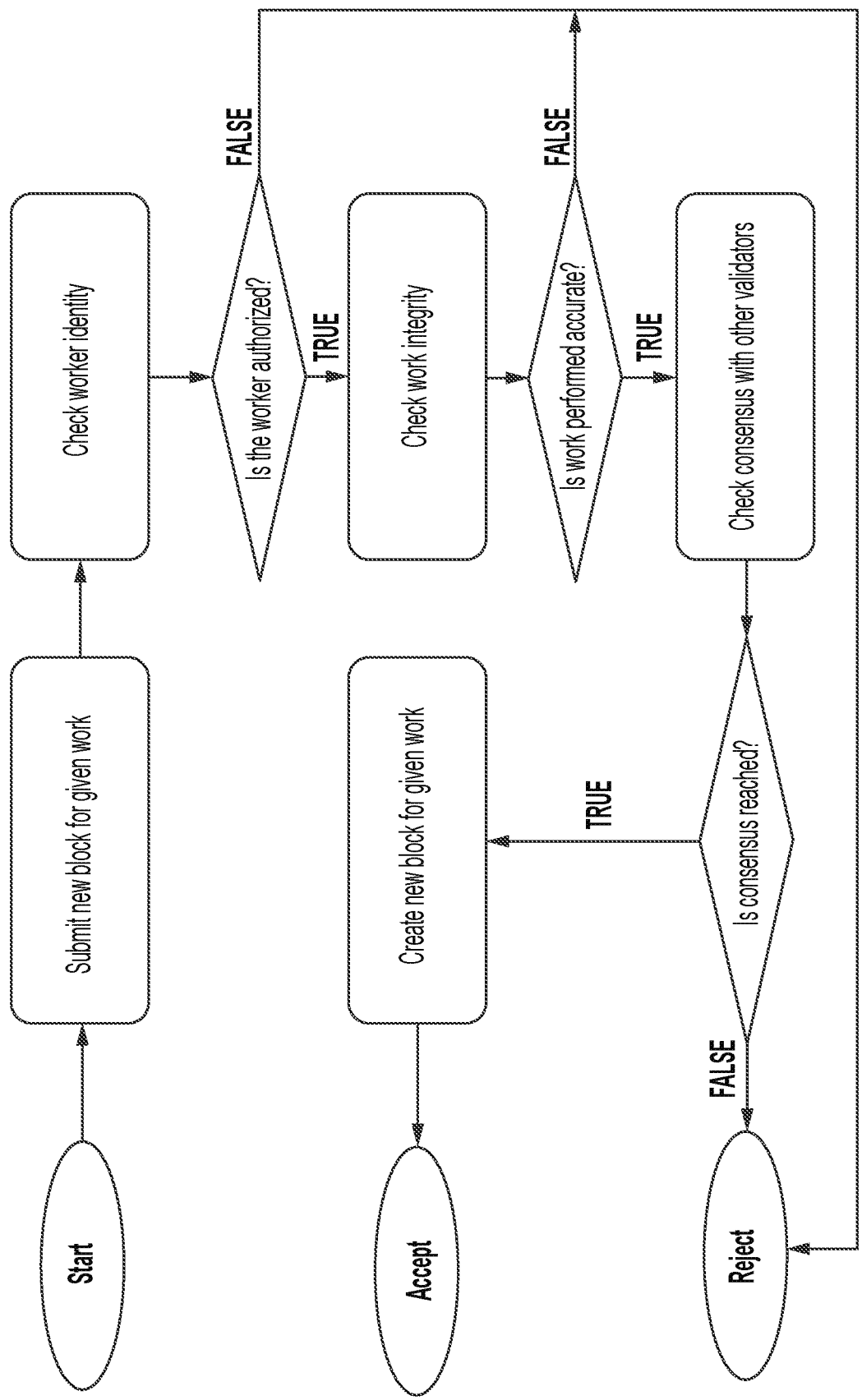
FIG. 22 illustrates a proposed hybrid consensus mechanism, in accordance with some embodiments of the present disclosure.

FIG. 21 illustrates a telecom-specific block creation mechanism, in accordance with some embodiments of the present disclosure. FIG. 22 illustrates a proposed hybrid consensus mechanism, in accordance with some embodiments of the present disclosure A description of elements of FIGS. 21 and 22 that have been previously described will be omitted for brevity. As illustrated in FIG. 21 and further detailed in FIG. 22, Validators 1940 perform verification of performed work before blocks 2010 are created. This work, if consensus has been reached, will create blocks on the blockchain 570 pertaining to works performed by other network participants. After consensus has been reached and world-related blocks 2010 have been created, Validators 1940 compute the rewards according to rewards schedule elected by the governance structure of the ledger 570. Rewards are distributed if consensus is reached for the calculation work they performed. The proposed hybrid consensus mechanism utilizes proof-of-stake (PoS) and some form of proof-of-work (PoW) with Validators 1940 voting on whether or not to add a new block 2010 to the blockchain-telecom ledger 570. The hybrid consensus mechanism randomly may choose N (e.g., 10) votes to determine the validity of the newly created block 2010. If some majority of the N (e.g., 7 of the 10) chosen votes are affirmative, the block 2010 is confirmed and added to the blockchain 570. Otherwise, the block creation request is rejected.

A governance structure of the blockchain-telecom ledger 570 implemented as a Decentralized Autonomous Organization (DAO) may vote to update the schedule of rewards amongst participants. The system is designed to prevent attacks from a majority attack (i.e., 51% attack) by implementing PoS voting as an additional, independent layer of verification. Although token economics for this proposed blockchain-telecom ledger 570 are out of scope of this disclosure, a stable token may be used with network utilization and proofs of actual work as the basis for incentivizing all network participants. An idea behind using a stable token is to avoid speculative and manipulative schemes present in the crypto industry. The stable token may be pegged to the US dollar and participants' roles and stake may determine their cut of the network utilization's revenue.

Asymmetric authentication has been arguably described as computationally intensive with symmetric schemes positioned as faster and requiring less power. A compromise may be utilized for decentralized mobile networks using blockchain technology to achieve interoperability and scalability. However, the architecture of the proposed system can be improved to achieve energy-efficiency. In order to make the dSIM (i.e., dAA and its associated applications) more energy efficient, a simple approach is implemented so that constantly polling the UE is not required with the UE's baseband processor only notifying the dSIM of network access events. This has the benefits of not draining the UE's power as the dSIM may subscribe to these notification events controlled by the baseband processor's clock in conjunction with communication over radio with a mobile network. The impact on the UE is therefore reduced and/or minimized from an energy consumption standpoint. For the mobile network core, more specifically, its access gateways hosting the dUDM (or its equivalent) at the radio edge, not requiring additional communication with a distant server to perform attachments, reduces and/or eliminates the need for roundtrip cloud-based mutual-authentications. It is also appreciated that computational power of access gateways at edge are not presently fully utilized and supporting asymmetric authentication does not drastically increase their power consumption.

Ultra-low latency for mission-critical applications (e.g., a vision-enabled drone that needs to make real-time decisions based on a remote server) is important. To achieve ultra-Low latency, embodiments of the present disclosure propose that authentication is performed at the edge with access gateways. Not utilizing additional communication with a distant server to perform attachments reduced and/or eliminates the need for roundtrip cloud-based mutual-authentications and thus helps reduce network attachment latency. When the UE is moving around a location and is connecting to multiple decentralized mobile networks, the reattachment via session handovers is very helpful. Orchestration servers may communicate network attachment session information across nodes of multiple decentralized mobile networks to ensure seamless roaming. Embodiments of the present disclosure incorporating the blockchain-telecom ledger can play an integral role in that orchestration.

Embodiments of the present disclosure provide motivating factors (e.g., improved security and privacy, better scalability, reduced complexity, ultra-low latency, etc.) for introducing asymmetric authentication in the context of truly decentralized and distributed mobile network systems. Embodiments of the present disclosure provide methods and systems for performing asymmetric authentication in said decentralized mobile networks. In one embodiment, modifications to an existing mobile network core and a user equipment to support the proposed authentication scheme have been disclosed. This embodiment is referred to as a 6G candidate. In another embodiment, this disclosure teaches relatively minor changes that can be made to a 5G mobile network system (and easily extended to a 4G/LTE mobile network system) to support said asymmetric authentication protocol. This alternative embodiment is referred to as a 4G/LTE and 5G candidate. In both embodiments, those skilled in the art can appreciate how any improvements could still be made to the specifications without deviating from the scope of the embodiments of the present disclosure.

Example Implementing Apparatuses

Figure 23:
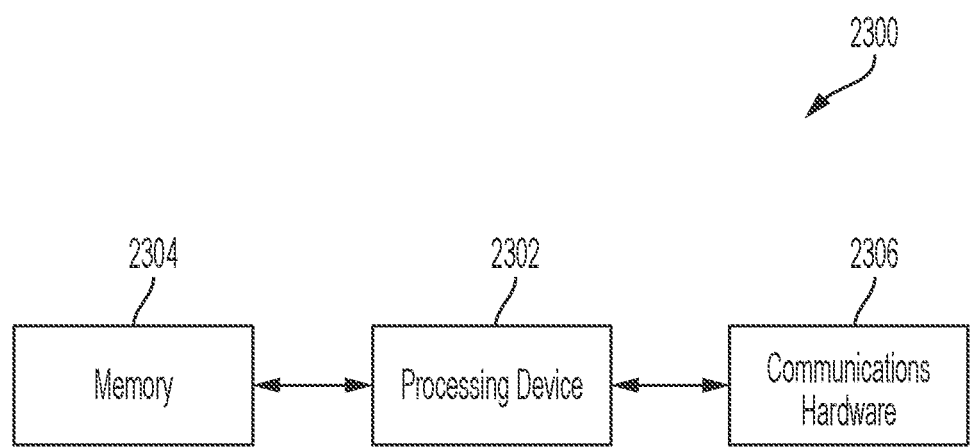
FIG. 23 illustrates a schematic block diagram of example circuitry embodying an apparatus that may perform various operations in accordance with some example embodiments described herein.

FIG. 23 illustrates a schematic block diagram of example circuitry embodying an apparatus that may perform various operations in accordance with some example embodiments described herein. The user equipment 110 and/or the dUDM 520 may be embodied by respective computing devices, an individual example of which is shown as apparatus 2300 in FIG. 23. The apparatus 2300 may include a processing device 2302, memory 2304, and communications hardware 2306, each of which will be described in greater detail below. While the various components are only illustrated in FIG. 23 as being connected with processing device 2302, it will be understood that the apparatus 2300 may further comprises a bus (not expressly shown in FIG. 23) for passing information amongst any combination of the various components of the apparatus 2300. The apparatus 2300 may be configured to execute various operations described above using these various components.

The processing device 2302 (and/or co-processor or any other processor assisting or otherwise associated with the processor) may be in communication with the memory 2304 via a bus for passing information amongst components of the apparatus. The processing device 2302 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 2300, remote or "cloud" processors, or any combination thereof.

The processing device 2302 may be configured to execute software instructions stored in the memory 2304 or otherwise accessible to the processing device 2302 (e.g., software instructions stored on a separate storage device). In some cases, the processing device 2302 may be configured to execute hard-coded functionality. As such, whether configured by hardware or software methods, or by a combination of hardware with software, the processing device 2302 represent an entity (e.g., physically embodied in circuitry) capable of performing operations according to various embodiments of the present invention while configured accordingly. Alternatively, as another example, when the processing device 2302 is embodied as an executor of software instructions, the software instructions may specifically configure the processing device 2302 to perform the algorithms and/or operations described herein when the software instructions are executed.

Memory 2304 is non-transitory and may include, for example, one or more volatile and/or non-volatile memories. In other words, for example, the memory 2304 may be an electronic storage device (e.g., a computer readable storage medium). The memory 2304 may be configured to store information, data, content, applications, software instructions, or the like, for enabling the apparatus to carry out various functions in accordance with example embodiments contemplated herein.

The communications hardware 2306 may be any means such as a device or circuitry embodied in either hardware or a combination of hardware and software that is configured to receive and/or transmit data from/to a network and/or any other device, circuitry, or module in communication with the apparatus 2300. In this regard, the communications hardware 2306 may include, for example, a network interface for enabling communications with a wired or wireless communication network. For example, the communications hardware 2306 may include one or more network interface cards, antennas, buses, switches, routers, modems, and supporting hardware and/or software, or any other device suitable for enabling communications via a network. Furthermore, the communications hardware 2306 may include the processing circuitry for causing transmission of such signals to a network or for handling receipt of signals received from a network.

The communications hardware 2306 may further be configured to provide output to a user and, in some embodiments, to receive an indication of user input. In this regard, the communications hardware 2306 may comprise a user interface, such as a display, and may further comprise the components that govern use of the user interface, such as a web browser, mobile application, dedicated client device, or the like. In some embodiments, the communications hardware 2306 may include a touch screen, touch areas, soft keys, a microphone, a speaker, a keyboard, a mouse, and/or other input/output mechanisms. The communications hardware 2306 may utilize the processing device 2302 to control one or more functions of one or more of these user interface elements through software instructions (e.g., application software and/or system software, such as firmware) stored on a memory (e.g., memory 2304) accessible to the processing device 2302.

Example Operations

Figure 24:
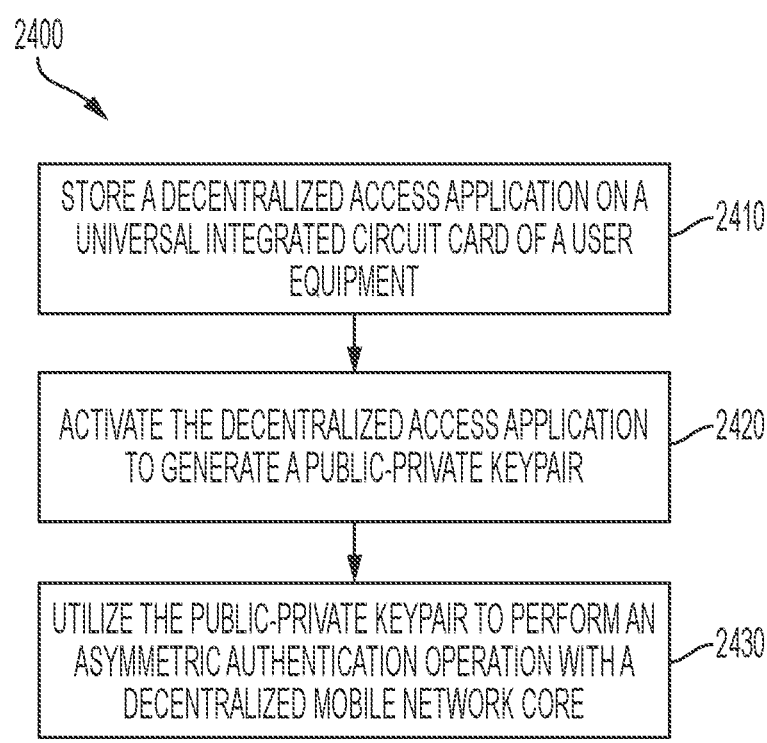
FIG. 24 illustrates an example flowchart for performing an asymmetric authentication operation with a decentralized mobile network core, in accordance with some example embodiments described herein.

Turning to FIG. 24, an example flowchart is illustrated that contains example operations implemented by example embodiments described herein. The operations illustrated in FIG. 24 may, for example, be performed by user equipment 110 shown in FIG. 1 and/or apparatus 2300 of FIG. 23. To perform the operations described below, the user equipment 110 may utilize one or more of processing device 2302, memory 2304, communications hardware 2306, and/or any combination thereof.

Referring to FIG. 24, example operations are shown of a method 2400 for performing an asymmetric authentication operation with a decentralized mobile network core.

As shown by operation 2410, the apparatus 2300 includes means, such as processing device 2302, memory 2304, communications hardware 2306, or the like, for storing a decentralized access application on a universal integrated circuit card of a user equipment 110. In some embodiments, storing the decentralized access application on the universal integrated circuit card of the user equipment comprises storing the decentralized access application a component of a decentralized electronic subscriber identity module of a removable, integrated, or virtual circuit chip. In some embodiments, the decentralized mobile network core comprises a modified Unified Data Management (UDM) for 5G or a modified Home Subscriber Server (HSS) for 4G/LTE.

As shown by operation 2420, the apparatus 2300 includes means, such as processing device 2302, memory 2304, communications hardware 2306, or the like, for activating the decentralized access application to generate a public-private keypair.

In some embodiments, the apparatus 2300 includes means, such as processing device 2302, memory 2304, communications hardware 2306, or the like, for accessing, from a blockchain ledger, a semi-fungible token, wherein the semi-fungible token comprises the decentralized access application. In some embodiments, activating the decentralized access application to generate a public-private keypair converts the semi-fungible token into a non-fungible token on the blockchain ledger. In some embodiments, a public key of the public-private keypair is stored on the blockchain ledger. In some embodiments, the public key of the public-private keypair is configured to be retrieved by the decentralized mobile network core from the blockchain ledger for identification, authentication, and/or handover purposes. In some embodiments, the blockchain ledger is a distributed blockchain ledger that is distributed among a plurality of computing nodes.

As shown by operation 2430, the apparatus 2300 includes means, such as processing device 2302, memory 2304, communications hardware 2306, or the like, for utilizing the public-private keypair to perform an asymmetric authentication operation with a decentralized mobile network core. In some embodiments, utilizing the public-private keypair to perform the asymmetric authentication operation with the decentralized mobile network core comprises tunneling data related to the asymmetric authentication operation using at least one of an authentication token or a random value. In some embodiments, tunneling the data related to the asymmetric authentication operation using the at least one of the authentication token or the random value comprises wrapping the data into multiple packets having a same size as the at least one of the authentication token or the random value. In some embodiments, tunneling the data related to the asymmetric authentication operation is performed responsive to detecting a flag having a defined value as part of an authentication request. In some embodiments, the authentication token and the defined value is all zeros.

FIG. 24 illustrates operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Figure 25:
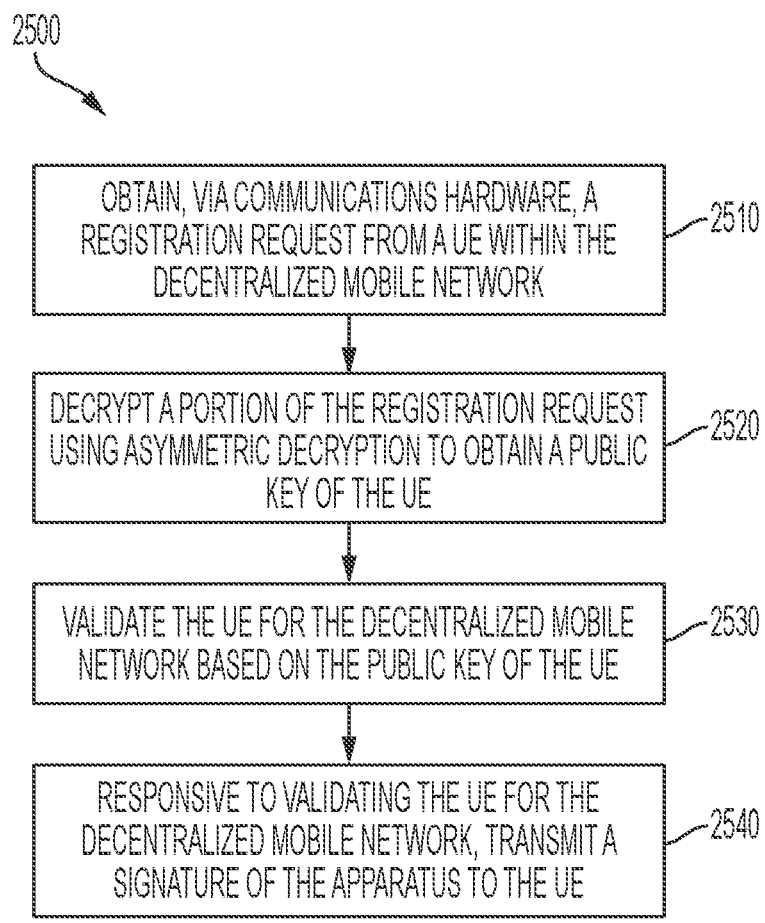
FIG. 25 illustrates an example flowchart for performing an asymmetric authentication operation with a UE, in accordance with some example embodiments described herein.

Turning to FIG. 25, an example flowchart is illustrated that contains example operations implemented by example embodiments described herein. The operations illustrated in FIG. 25 may, for example, be performed by dUDM 520 shown in FIG. 5 and/or apparatus 2300 of FIG. 23. To perform the operations described below, the dUDM 520 may utilize one or more of processing device 2302, memory 2304, communications hardware 2306, and/or any combination thereof.

Referring to FIG. 25, example operations are shown of a method 2500 for performing an asymmetric authentication operation with a UE.

As shown by operation 2510, the apparatus 2300 includes means, such as processing device 2302, memory 2304, communications hardware 2306, or the like, for obtaining, via the communications hardware 2306, a registration request from a UE 110 within a decentralized mobile network. In some embodiments, the registration request from the UE 110 includes a random number, and the processing device 2302 is further configured to generate the signature of the apparatus 2300 based on the random number of the registration request.

As shown by operation 2520, the apparatus 2300 includes means, such as processing device 2302, memory 2304, communications hardware 2306, or the like, for decrypting a portion of the registration request using asymmetric decryption to obtain a public key of the UE 110.

As shown by operation 2530, the apparatus 2300 includes means, such as processing device 2302, memory 2304, communications hardware 2306, or the like, for validating the UE 110 for the decentralized mobile network based on the public key of the UE 110.

In some embodiments, the apparatus 2300 may be further include a blockchain interface. In some embodiments, to validate the UE 110 for the decentralized mobile network based on the public key of the UE 110, the processing device 2302 is configured to access a blockchain ledger 570 to obtain a certificate of the UE 110 based on the public key of the UE 110 and validate the certificate. In some embodiments, the processing device 2302 may transmit a request to validate the certificate.

As shown by operation 2540, the apparatus 2300 includes means, such as processing device 2302, memory 2304, communications hardware 2306, or the like, for transmitting a signature of the apparatus to the UE 110 responsive to validating the UE 110 for the decentralized mobile network.

In some embodiments, the processing device 2300 is further configured to obtain, via the communications hardware 2306, a personalization request from the UE 100, validate a personalization server 710 based on a public key of the personalization server 710 to obtain an internet protocol (IP) address of the personalization server 710, and transmit the IP address of the personalization server 710 to the UE 110. In some embodiments, the personalization request comprises a public key of the personalization server 710. In some embodiments, the apparatus 2300 may be further include a blockchain interface. In some embodiments, to validate the personalization server 710 based on the public key of the personalization server 710, the processing device 2302 is configured to access a blockchain ledger 570 to obtain the IP address of the personalization server 710 based on the public key of the personalization server 710.

In some embodiments, the processing device 2302 is further configured to: obtain, via the communications hardware 2306, an authorization request from the UE 110 and, responsive to receiving the authorization request, tunnel data related to an asymmetric authentication operation using at least one of an authentication token or a random value. In some embodiments, to tunnel the data related to the asymmetric authentication operation using the at least one of the authentication token or the random value, the processing device 2302 is configured to wrap the data into multiple packets having a same size as the at least one of the authentication token or the random value. In some embodiments, the processing device 2302 is further configured to transmit a flag having a defined value as part of a challenge request to the UE 110 to indicate compatibility with the asymmetric authentication operation. In some embodiments, the flag is the authentication token and the defined value is all zeros.

FIG. 25 illustrates operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
a processing device;
a baseband processor configured to communicate wirelessly with a decentralized mobile network core; and
a universal integrated circuit card (UICC) storing a decentralized electronic subscriber identity module (dSIM) that hosts a decentralized access application that is configured to authenticate the apparatus during a secure initialization process, via the baseband processor, with the decentralized mobile network core using a private key generated by the dSIM and a corresponding public key, wherein authentication of the apparatus does not require use of an International Mobile Subscriber Identity (IMSI) of the apparatus,
wherein the baseband processor is not natively configured to independently authenticate the apparatus using the private key,
wherein the baseband processor is configured to authenticate the apparatus in conjunction with the decentralized access application.

2. The apparatus of claim 1, wherein the processing device is configured to:
retrieve the decentralized access application from a blockchain ledger as a semi-fungible token; and
install and activate the decentralized access application, thereby converting the decentralized access application to a non-fungible token on the blockchain ledger.

3. The apparatus of claim 2, wherein the activation of the decentralized access application results in a creation of a public-private keypair, and
wherein a public key of the public-private keypair is stored on the blockchain ledger.

4. The apparatus of claim 3, wherein the public key of the public-private keypair is configured to be retrieved by the decentralized mobile network core from the blockchain ledger for identification, authentication, and/or handover purposes.

5. The apparatus of claim 1, wherein the decentralized mobile network core comprises a modified Unified Data Management (UDM) for 5G or a modified Home Subscriber Server (HSS) for 4G/LTE.

6. The apparatus of claim 1, wherein, to perform an asymmetric authentication session, the processing device is configured to tunnel, via the baseband processor and utilizing a data structure that is not interpreted by the baseband processor, data related to the asymmetric authentication session using at least one of an authentication token or a random value.

7. The apparatus of claim 6, wherein, to tunnel the data related to the asymmetric authentication session using the at least one of the authentication token or the random value, the processing device is configured to wrap the data into multiple packets having a same size as the at least one of the authentication token or the random value.

8. The apparatus of claim 6, wherein the processing device is configured to tunnel the data related to the asymmetric authentication session responsive to detecting a flag having a defined value as part of an authentication request.

9. The apparatus of claim 8, wherein the flag is the authentication token and the defined value is all zeros.

10. The apparatus of claim 1, wherein the decentralized access application is configured to authenticate the apparatus without requiring the decentralized mobile network core to interact with a remote server.

11. The apparatus of claim 1, wherein authenticating the apparatus using a private key does not require changes in modem firmware of the apparatus.

12. A computer-implemented method comprising:
storing a decentralized access application on a universal integrated circuit card of a user equipment;
activating the decentralized access application to generate a public-private keypair; and
utilizing the public-private keypair to perform an asymmetric authentication operation during a secure initialization process, via a baseband processor, with a decentralized mobile network core, wherein the asymmetric authentication operation authenticates the user equipment using the public-private keypair generated by the decentralized access application, wherein authentication of the user equipment does not require use of an International Mobile Subscriber Identity (IMSI) of the user equipment,
wherein the baseband processor is not natively configured to independently authenticate the user equipment using the public-private keypair,
wherein the baseband processor is configured to authenticate the user equipment in conjunction with the decentralized access application.

13. The computer-implemented method of claim 12, further comprising:
accessing, from a blockchain ledger, a semi-fungible token, wherein the semi-fungible token comprises the decentralized access application.

14. The computer-implemented method of claim 13, wherein activating the decentralized access application to generate a public-private keypair converts the semi-fungible token into a non-fungible token on the blockchain ledger.

15. The computer-implemented method of claim 13, wherein a public key of the public-private keypair is stored on the blockchain ledger.

16. The computer-implemented method of claim 15, wherein the public key of the public-private keypair is configured to be retrieved by the decentralized mobile network core from the blockchain ledger for identification, authentication, and/or handover purposes.

17. The computer-implemented method of claim 12, wherein storing the decentralized access application on the universal integrated circuit card of the user equipment comprises storing the decentralized access application in a component of a decentralized electronic subscriber identity module of a removable, integrated, or virtual circuit chip.

18. The computer-implemented method of claim 12, wherein the decentralized mobile network core comprises a modified Unified Data Management (UDM) for 5G or a modified Home Subscriber Server (HSS) for 4G/LTE.

19. The computer-implemented method of claim 12, wherein utilizing the public-private keypair to perform the asymmetric authentication operation with the decentralized mobile network core comprises tunneling, via the baseband processor and utilizing a data structure that is not interpreted by the baseband processor, data related to the asymmetric authentication operation using at least one of an authentication token or a random value.

20. The computer-implemented method of claim 19, wherein tunneling the data related to the asymmetric authentication operation using the at least one of the authentication token or the random value comprises wrapping the data into multiple packets having a same size as the at least one of the authentication token or the random value.

21. The computer-implemented method of claim 19, wherein tunneling the data related to the asymmetric authentication operation is performed responsive to detecting a flag having a defined value as part of an authentication request.

22. The computer-implemented method of claim 21, wherein the flag is the authentication token and the defined value is all zeros.

23. The computer-implemented method of claim 12, wherein the asymmetric authentication operation authenticates the user equipment without requiring the decentralized mobile network core to interact with a remote server.

* * * * *